United States Patent
Fujio et al.

(10) Patent No.: US 11,927,226 B2
(45) Date of Patent: Mar. 12, 2024

(54) FIXED TYPE CONSTANT VELOCITY UNIVERSAL JOINT

(71) Applicant: NTN CORPORATION, Osaka (JP)

(72) Inventors: Teruaki Fujio, Shizuoka (JP); Masashi Funahashi, Shizuoka (JP)

(73) Assignee: NTN CORPORATION, Osaka (JP)

( * ) Notice: Subject to any disclaimer, the term of this patent is extended or adjusted under 35 U.S.C. 154(b) by 527 days.

(21) Appl. No.: 17/041,206

(22) PCT Filed: Mar. 27, 2019

(86) PCT No.: PCT/JP2019/013212
§ 371 (c)(1),
(2) Date: Sep. 24, 2020

(87) PCT Pub. No.: WO2019/194046
PCT Pub. Date: Oct. 10, 2019

(65) Prior Publication Data
US 2021/0033152 A1 Feb. 4, 2021

(30) Foreign Application Priority Data

Apr. 3, 2018 (JP) ................................ 2018-071601
Mar. 15, 2019 (JP) ................................ 2019-048306

(51) Int. Cl.
*F16D 3/224* (2011.01)
*F16D 3/2237* (2011.01)
(Continued)

(52) U.S. Cl.
CPC ........... *F16D 3/2237* (2013.01); *F16D 3/224* (2013.01); *F16D 3/2245* (2013.01);
(Continued)

(58) Field of Classification Search
CPC ...... F16D 3/2237; F16D 3/224; F16D 3/2245; F16D 2003/22303; F16D 2003/22309; Y10S 464/906
(Continued)

(56) References Cited

U.S. PATENT DOCUMENTS

| | | | |
|---|---|---|---|
| 6,431,988 B1* | 8/2002 | Tone | F16D 3/2237 464/145 |
| 8,342,971 B2* | 1/2013 | Kobayashi | F16D 3/2237 464/145 |
| 2004/0180724 A1 | 9/2004 | Nakagawa et al. | |

FOREIGN PATENT DOCUMENTS

| | | |
|---|---|---|
| JP | 4041641 | 1/2008 |
| JP | 4133415 | 8/2008 |
| JP | 4885236 | 2/2012 |

OTHER PUBLICATIONS

Universal Joint and Driveshaft Design Manual, AE-7, Society of Automotive Engineers Inc., Warrendale, PA, Chapter 3.2.8, pp. 145-150. TJ1079.S62 (Year: 1979).*

(Continued)

*Primary Examiner* — Greg Binda
(74) *Attorney, Agent, or Firm* — Wenderoth, Lind & Ponack, LLP.

(57) ABSTRACT

A fixed type constant velocity universal joint has an operation mode in which, when a maximum operating angle is taken, in a column portion that is one of column portions on both sides of a pocket of a cage receiving a torque transmission ball at a phase angle and is located on a side corresponding to a phase angle larger than the phase angle, a projection end portion obtained by projecting an end portion of a spherical inner peripheral surface of the outer joint member on the opening side in a perpendicular direction toward the spherical outer peripheral surface of the cage and a projection end portion obtained by projecting an end (Continued)

portion of the spherical outer peripheral surface of the inner joint member on the back side in the perpendicular direction toward the spherical inner peripheral surface of the cage overlap in the axial direction of the cage.

2 Claims, 14 Drawing Sheets

(51) Int. Cl.
*F16D 3/2245* (2011.01)
*F16D 3/223* (2011.01)

(52) U.S. Cl.
CPC .............. *F16D 2003/22303* (2013.01); *F16D 2003/22309* (2013.01); *Y10S 464/906* (2013.01)

(58) Field of Classification Search
USPC .................................................. 464/144–145
See application file for complete search history.

(56) References Cited

OTHER PUBLICATIONS

International Preliminary Report on Patentability and Written Opinion of the International Searching Authority dated Oct. 6, 2020 in International (PCT) Application No. PCT/JP2019/013212.
International Search Report dated Jul. 2, 2019 in International (PCT) Application No. PCT/JP2019/013212, with English translation.

* cited by examiner

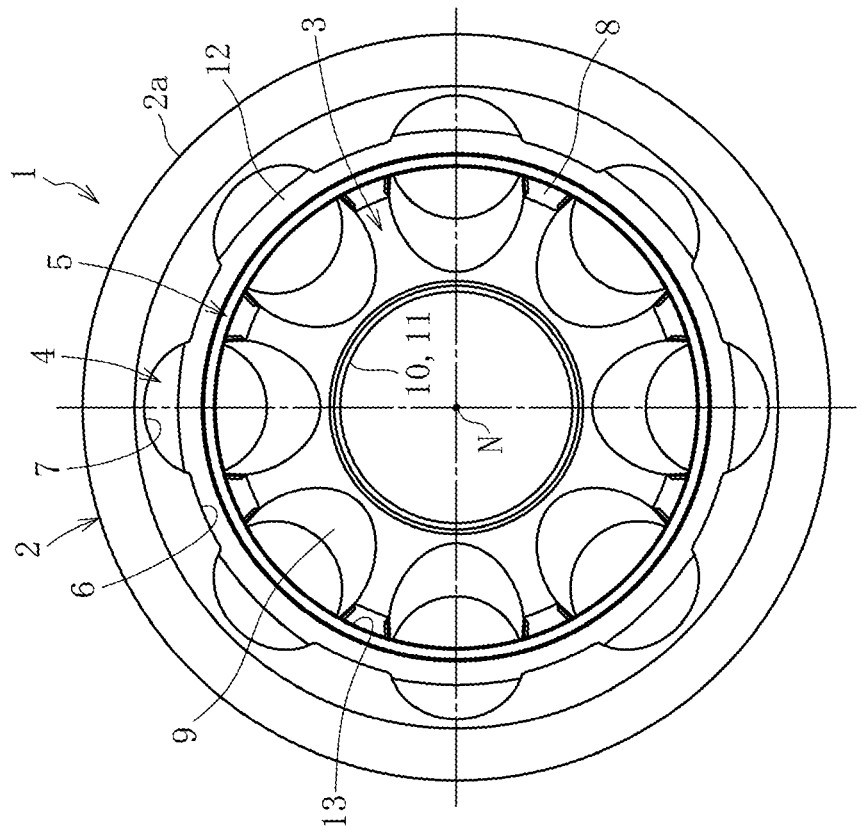
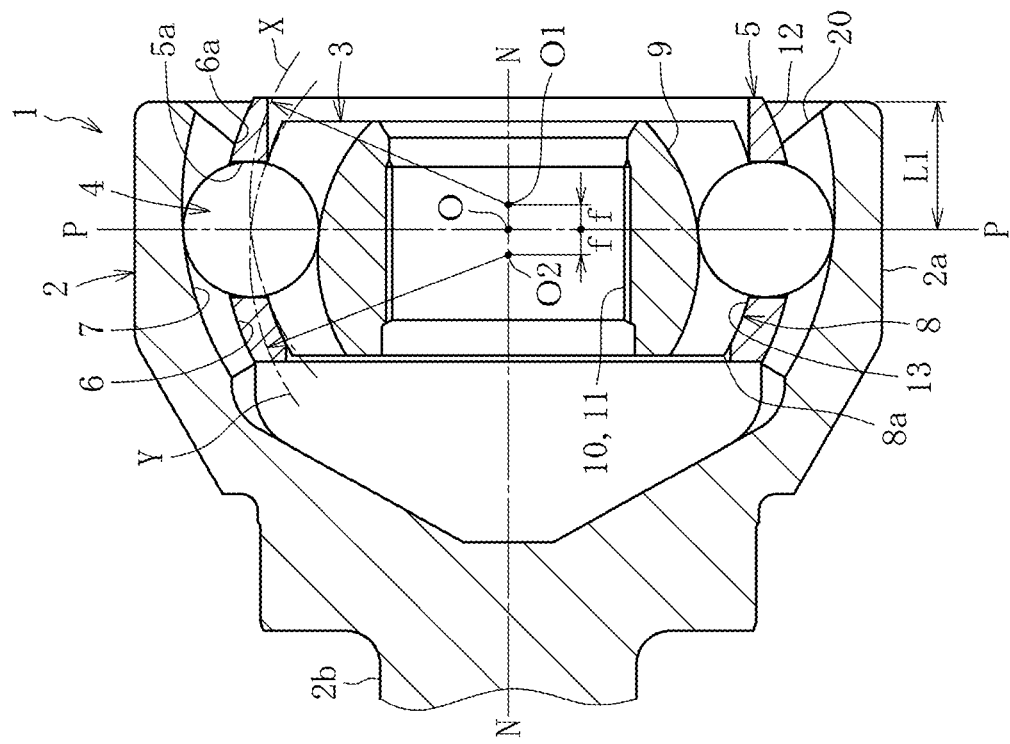

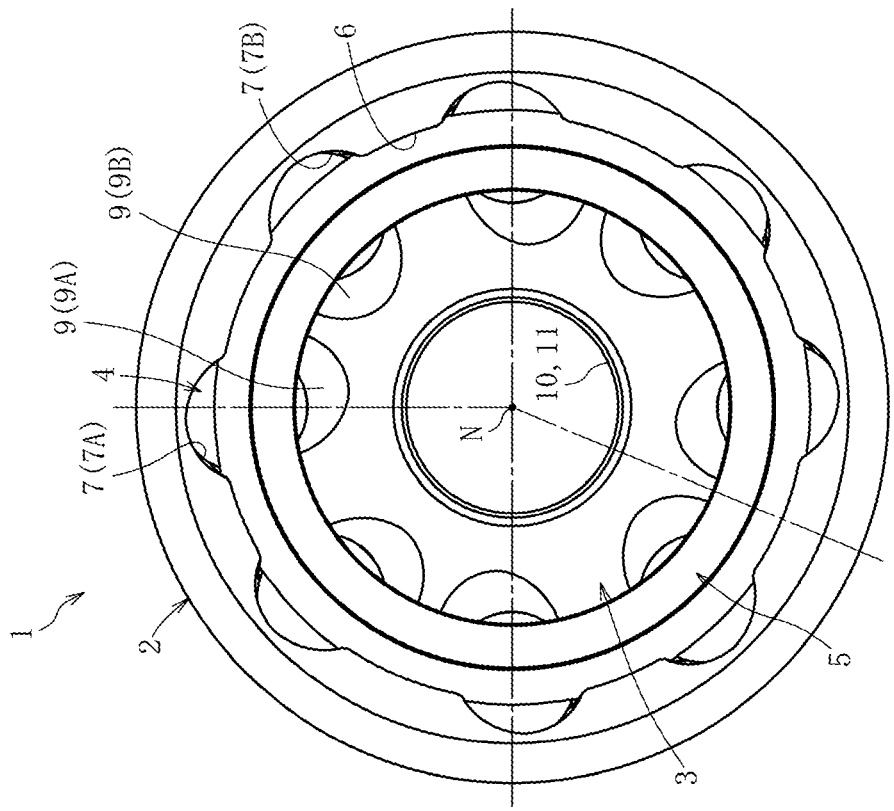
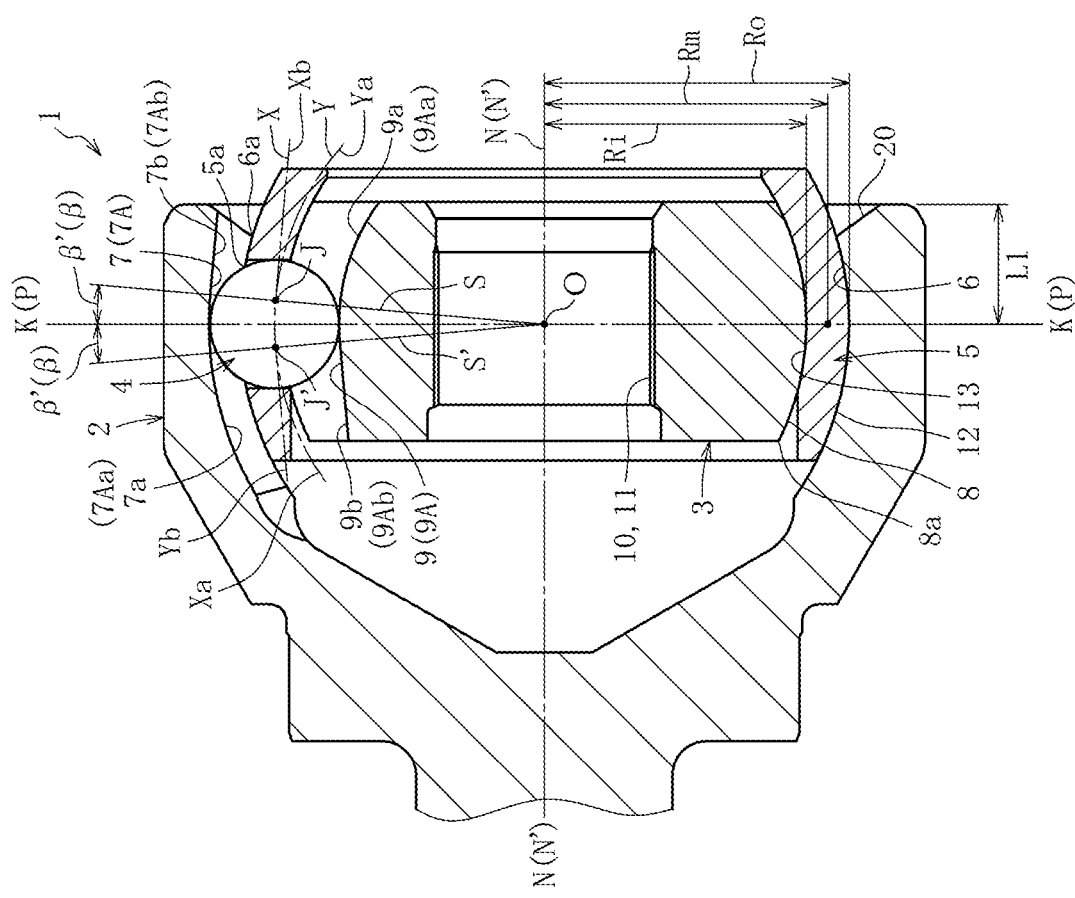
FIG. 13a
FIG. 13b

FIXED TYPE CONSTANT VELOCITY UNIVERSAL JOINT

TECHNICAL FIELD

The present invention relates to a fixed type constant velocity universal joint.

BACKGROUND ART

In a constant velocity universal joint, which is used to construct a power transmission system for automobiles and various industrial machines, two shafts on a driving side and a driven side are coupled to each other to allow torque transmission therebetween, and rotational torque can be transmitted at a constant velocity even when the two shafts form an operating angle. The constant velocity universal joint is roughly classified into a fixed type constant velocity universal joint that allows only angular displacement, and a plunging type constant velocity universal joint that allows both the angular displacement and axial displacement. In a drive shaft configured to transmit power from an engine of an automobile to a driving wheel, for example, the plunging type constant velocity universal joint is used on a differential side (inboard side), and the fixed type constant velocity universal joint is used on a driving wheel side (outboard side).

Functions required for a fixed type constant velocity universal joint for a drive shaft of an automobile include a large operating angle, which conforms to the steering of wheels, and a strength suitable for the large operating angle. In the related art, in general, a Rzeppa constant velocity universal joint (BJ type) has a maximum operating angle of 47°, and an undercut-free constant velocity universal joint (UJ type) has a maximum operating angle of 50°. From the viewpoint of improving the turning performance of an automobile and improving ease of tight turns, there have been increasing demands for a maximum operating angle larger than 50°. In order to meet those demands, fixed type constant velocity universal joints of various structure have been proposed.

In Patent Document 1, there is proposed a fixed type constant velocity universal joint having the structure in which track grooves of an outer joint member and an inner joint member each have a combination of an arc shape and a tapered shape to achieve the large operating angle without increasing an outer diameter. In Patent Literature 2, it is described that, in a related-art fixed type constant velocity universal joint, at the time of the maximum operating angle, regarding a torque transmission ball (hereinafter simply referred to as "ball") located at a phase angle (phase angle 0°) at which the ball moves most toward an opening side of the outer joint member, a ratio of an axis parallel distance between a center of the ball and a joint center to an axis parallel distance between the center of the ball and an opening conical surface of the outer joint member is set to be less than 2.9, thereby being capable of maintaining the function even at the time of the maximum operating angle. Further, it is also described that, in a case in which the operating angle is taken so that the ball projects to such an extent of losing a contact from the track groove of the outer joint member, the function can be maintained by setting the ratio to be less than 2.2.

In Patent Document 3, there is described a mode in which, when a fixed type constant velocity universal joint takes a large operating angle, respective spherical surface edges of an outer joint member and an inner joint member bite into a cage to cause a shear fracture. The strength of the cage can be secured by setting an angle formed, in a longitudinal cross section of the fixed type constant velocity universal joint taking the maximum operating angle, between a straight line connecting a contact point of a spherical outer peripheral surface of the cage with an edge portion of a spherical inner peripheral surface of the outer joint member and a contact point of a spherical inner peripheral surface of the cage with an edge portion of a spherical outer peripheral surface of the inner joint member and a center line of the cage to be equal to or smaller than 10°.

PRIOR ART DOCUMENTS

Patent Documents

Patent Document 1: JP 4041641 B2
Patent Document 2: JP 4885236 B2
Patent Document 3: JP 4133415 B2

SUMMARY OF THE INVENTION

Problems to be Solved by the Invention

When a fixed type constant velocity universal joint takes a large operating angle equal to or larger than that of the related art, it is required that a length of the outer joint member be set short so as to prevent interference between an intermediate shaft and the outer joint member. However, as a result, track grooves of the outer joint member become shorter, and a ball located around the phase angle of 0° comes off the track groove and loses a contact. However, in Patent Document 2, no focus is given to the problem of the strength of the cage in the fixed type constant velocity universal joint having such an operation mode.

The shear state of the cage described in Patent Document 3 occurs because, when the large operating angle is taken, the ball generates a force to push the cage toward the opening side of the constant velocity universal joint to press the cage against the outer joint member and the inner joint member. It was found difficult to reduce the length of the track grooves of the outer joint member to take the large operating angle. Further, it was also found difficult, in the case of taking a large operating angle larger than the maximum operating angle given in the related art, to maintain an angle formed between the straight line connecting the contact point of the spherical outer peripheral surface of the cage with the edge portion of the spherical inner peripheral surface of the outer joint member and the contact point of the spherical inner peripheral surface of the cage with the edge portion of the spherical outer peripheral surface of the inner joint member and the center line of the cage at an angle equal to or smaller than 10°.

As a countermeasure against the problems described above, it is conceivable to increase a width of the inner joint member to set the angle to be equal to or smaller than 10°. However, in this case, the increase in the width of the inner joint member may impair the ease of assembly to the cage. Moreover, in some cases, an assembly inlay diameter of the cage becomes excessively larger, with the result that the cage cannot be formed. In addition, there is also a fear of causing a problem such as an increase in weight.

Moreover, when a ball located around the phase angle of 0° loses a contact, the force generated by the ball to push the cage is lost in the range of the phase angle in which the contact is lost. Therefore, the balance of the force acting inside the joint is changed, with the result that a direction of pushing the cage or a magnitude of the force varies. As a result, it was found that a sufficient effect cannot be obtained with the method of Patent Document 3.

In view of the problems described above, the present invention has an object to provide a fixed type constant velocity universal joint, which has an operation mode in which a ball comes off a track groove to lose a contact when a large operating angle is taken, capable of suppressing a mode of a shear fracture due to respective spherical surface edges of an outer joint member and an inner joint member biting into a cage and capable of suppressing an increase in weight.

Solution to the Problems

As a result of extensive studies conducted to achieve the object described above, the inventors of the present invention gave focus to the fact that, at the time of the large operating angle, a track load is large when a torque transmission ball which is in a non-contact state with respect to a track groove of an outer joint member returns to an end portion of the track groove on an opening side to start a contact state with respect to the track groove, and then hit on a novel idea of securing the strength of the cage given at the time of starting the contact state, thereby achieving the present invention.

As a technical measure to achieve the object described above, according to one embodiment of the present invention, there is provided a fixed type constant velocity universal joint that has an outer joint member, which has a plurality of track grooves formed in its spherical inner peripheral surface that extend substantially in a longitudinal direction, and has opening and back sides apart from each other in an axial direction of the outer joint member, and an inner joint member, which has a plurality of track grooves-being formed in its spherical outer peripheral surface that extend substantially in the longitudinal direction so as to be opposed to the track grooves of the outer joint member. The fixed type constant velocity universal joint also has torque transmission balls incorporated in pairs of the track grooves opposed to each other, and a cage configured to retain the torque transmission balls. The cage has a spherical outer peripheral surface to be guided by the spherical inner peripheral surface of the outer joint member, and a spherical inner peripheral surface to be guided by the spherical outer peripheral surface of the inner joint member. The fixed type constant velocity universal joint has an operation mode in which, when a maximum operating angle is taken, a torque transmission ball of the torque transmission balls that is closest to an opening side of a track groove of the track grooves of the outer joint member comes off an end portion of the track groove of the outer joint member on the opening side to start a non-contact state with respect to the track groove at a first phase angle ($\varphi 2$) position along a direction of rotation and returns to the end portion of the track groove of the outer joint member on the opening side to start a contact state with respect to the track groove at a second phase, angle ($\varphi 1$) position along the direction of rotation. Further, under the state in which the maximum operating angle is taken, at a column portion that is one of column portions on opposite sides of a pocket of the cage receiving the torque transmission ball at the second phase angle ($\varphi 1$) position and is located at a phase angle position ahead of the second phase angle ($\varphi 1$) position along the direction of rotation, a first projection end portion (Eo) obtained by projecting an end portion of the spherical inner peripheral surface of the outer joint member on the opening side in direction that is perpendicular to an axial direction of the cage toward the spherical outer peripheral surface of the cage and a second projection end portion (Ei) obtained by projecting an end portion of the spherical outer peripheral surface of the inner joint member that is closest to the back side of the outer joint member in the perpendicular direction toward the spherical inner peripheral surface of the cage at least partially overlap each other in the axial direction of the cage.

With the configuration described above, in relation to the fixed type constant velocity universal joint having the operation mode in which the ball and the track groove are brought into the non-contact state when the large operating angle is taken, a fixed type constant velocity universal joint capable of suppressing the mode of the shear fracture due to respective spherical surface edges of the outer joint member and the inner joint member biting into the cage and capable of suppressing an increase in weight can be achieved.

Specifically, it is preferred that, when a length of the cage at the above-mentioned overlapping portion in the axial direction is represented by Lt, and a radius of a center of the cage 5 in the radial thickness direction is represented by Rm, a ratio Lt/Rm be set to be equal to or more than 0.03. With this, the shear state in the column portion can be sufficiently suppressed. Further, there is no problem as to the assembly of the inner joint member to the cage, and the weight can be suppressed.

It is preferred that, in the fixed type constant velocity universal joint, the track groove of the outer joint member and the track groove of the inner joint member described above be inclined in a circumferential direction with respect to an axis of the joint, and the torque transmission ball be incorporated in an intersecting portion of the track grooves. With this, a fixed type constant velocity universal joint which is small in torque loss and generation of heat and is highly efficient while securing the strength of the cage can be achieved.

Effects of the Invention

According to the present invention, in relation to the fixed type constant velocity universal joint having the operation mode in which the ball and the track groove are brought into the non-contact state when the large operating angle is taken, a fixed type constant velocity universal joint capable of suppressing the mode of the shear fracture due to respective spherical surface edges of the outer joint member and the inner joint member biting into the cage and capable of suppressing an increase in weight can be achieved.

BRIEF DESCRIPTION OF DRAWINGS

FIG. 1a is a longitudinal sectional view for illustrating a fixed type constant velocity universal joint according to a first embodiment of the present invention.

FIG. 1a is a right-side view of FIG. 1a.

FIG. 2 is an enlarged transverse sectional view for illustrating one torque transmission ball and track grooves taken along the line P-P of FIG. 1a.

FIG. 3b is a right-side view of FIG. 3a.

FIG. 4 is an enlarged longitudinal sectional view for illustrating the H portion of FIG. 3a.

FIG. 11b is a right-side view of FIG. 11a.

FIG. 13a is a longitudinal sectional view for illustrating a fixed type constant velocity universal joint according to a second embodiment of the present invention.

FIG. 13b is a right-side view of FIG. 13a.

FIG. 14a is a longitudinal sectional view for illustrating the outer joint member of FIG. 13a.

FIG. 14b is a right-side view of FIG. 14a.

FIG. 15a is a front view for illustrating the inner joint member of FIG. 13a.

FIG. 15b is a right-side view of FIG. 15a.

FIG. 16b is a right-side view of FIG. 16a.

FIG. 17b is a right-side view of FIG. 17a.

EMBODIMENTS OF THE INVENTION

Figure 2:
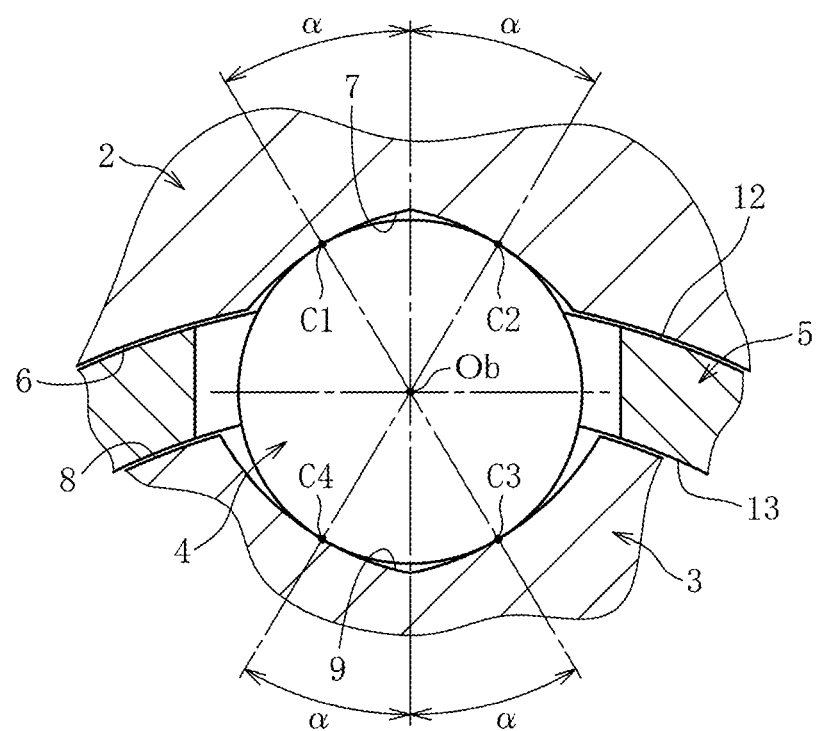

A fixed type constant velocity universal joint according to a first embodiment of the present invention is described with reference to FIGS. 1 to FIG. 12. FIG. 1a is a longitudinal sectional view for illustrating the fixed type constant velocity universal joint according to the first embodiment of the present invention. FIG. 1b is a right-side view of FIG. 1a. As illustrated in FIG. 1a and FIG. 1b, a fixed type constant velocity universal joint 1 according to this embodiment is based on a Rzeppa constant velocity universal joint and mainly comprises an outer joint member 2, an inner joint member 3, torque transmission balls (hereinafter simply referred to as "balls") 4, and a cage 5. A spherical inner peripheral surface 6 of the outer joint member 2 has eight curved track grooves 7. The track grooves 7 are formed at equal intervals in a circumferential direction and extend along an axial direction. A spherical outer peripheral surface 8 of the inner joint member 3 has eight curved track grooves 9 opposed to the track grooves 7 of the outer joint member 2. The track grooves 9 are formed at equal intervals in a circumferential direction and extend along an axial direction. Eight balls 4 configured to transmit torque are incorporated in pairs of the track grooves 7 of the outer joint member 2 and the track grooves 9 of the inner joint member 3, respectively. The cage 5 configured to retain the balls 4 is arranged between the spherical inner peripheral surface 6 of the outer joint member 2 and the spherical outer peripheral surface 8 of the inner joint member 3. The balls 4 are received in pockets 5a of the cage 5. A spherical outer peripheral surface 12 of the cage 5 is fitted to the spherical inner peripheral surface 6 of the outer joint member 2 in a freely slidable manner, and a spherical inner peripheral surface 13 of the cage 5 is fitted to the spherical outer peripheral surface 8 of the inner joint member 3 in a freely slidable manner.

In order to accurately indicate a mode and a shape of each track groove extending substantially in the axial direction, description is made with use of the term "ball raceway center line" in Description. The ball raceway center line corresponds to a locus formed by a center of the ball when the ball arranged in the track groove moves along the track groove.

A curvature center of the spherical inner peripheral surface 6 of the outer joint member 2 and a curvature center of the spherical outer peripheral surface 8 of the inner joint member 3 are each formed at a joint center O. In contrast, a curvature center O1 of a ball raceway center line X of the curved track groove 7 of the outer joint member 2 and a curvature center O2 of a ball raceway center line Y of the curved track groove 9 of the inner joint member 3 are equally offset by a distance f to opposite sides in the axial direction from the joint center O. With this configuration, when the fixed type constant velocity universal joint 1 takes an operating angle, the balls 4 are always guided on a plane bisecting an angle formed by axes of the outer joint member 2 and the inner joint member 3, thereby transmitting rotation between two shafts at constant velocity.

A radially inner hole 10 of the inner joint member 3 has a female spline (the spline includes a serration, which similarly applies in the following description) 11, and a male spline 15 formed at an end portion of an intermediate shaft 14 (see FIG. 3a) is fitted to the female spline 11, thereby coupling the intermediate shaft 14 to the inner joint member 3 so as to enable transmission of torque. The inner joint member 3 and the intermediate shaft 14 are positioned in the axial direction by a stopper ring 16.

Although illustration is omitted, a boot is mounted to an outer periphery of the outer joint member 2 and an outer periphery of the intermediate shaft 14 coupled to the inner joint member 3, and both ends of the boot are fastened and fixed with boot bands. Grease serving as a lubricant is filled in an inside of the joint covered with the boot. With the boot being mounted, leakage of the grease to an outside and entry of foreign objects from the outside of the joint can be prevented.

As illustrated in FIG. 1a, a stem portion 2b is formed integrally with a bottom part of a mouth portion 2a of the outer joint member 2. Although illustration is omitted, the stem portion 2b has a male spline and a threaded portion to be fitted to a hub wheel to which a drive wheel is mounted.

FIG. 2 is an enlarged transverse sectional view for illustrating one ball and track grooves taken along the line P-P of FIG. 1a. A transverse sectional shape of each of the track grooves 7 of the outer joint member 2 and the track grooves 9 of the inner joint member 3 is an elliptical shape or a gothic-arch shape. As illustrated in FIG. 2, the ball 4 is brought into angular contact with the track groove 7 of the outer joint member 2 at two points C1 and C2 and is brought into angular contact with the track groove 9 of the inner joint member 3 at two points C3 and C4. It is preferred that an angle (contact angle $\alpha$) formed between a straight line passing through a center Ob of the ball 4 and each of contacts C1, C2, C3, and C4 and a straight line passing through the center Ob of the ball 4 and the joint center O (see FIG. 1a) be set to be equal to or larger than 30°. The transverse sectional shape of each of the track grooves 7 and 9 may be an arc shape, and the track grooves 7 and 9 and the ball 4 may be brought into circular contact with each other.

The overall configuration of the fixed type constant velocity universal joint 1 according to this embodiment is as described above. Next, characteristic configurations are described. The characteristic configurations of the fixed type constant velocity universal joint 1 according to this embodiment are summarized below.

Figure 5:
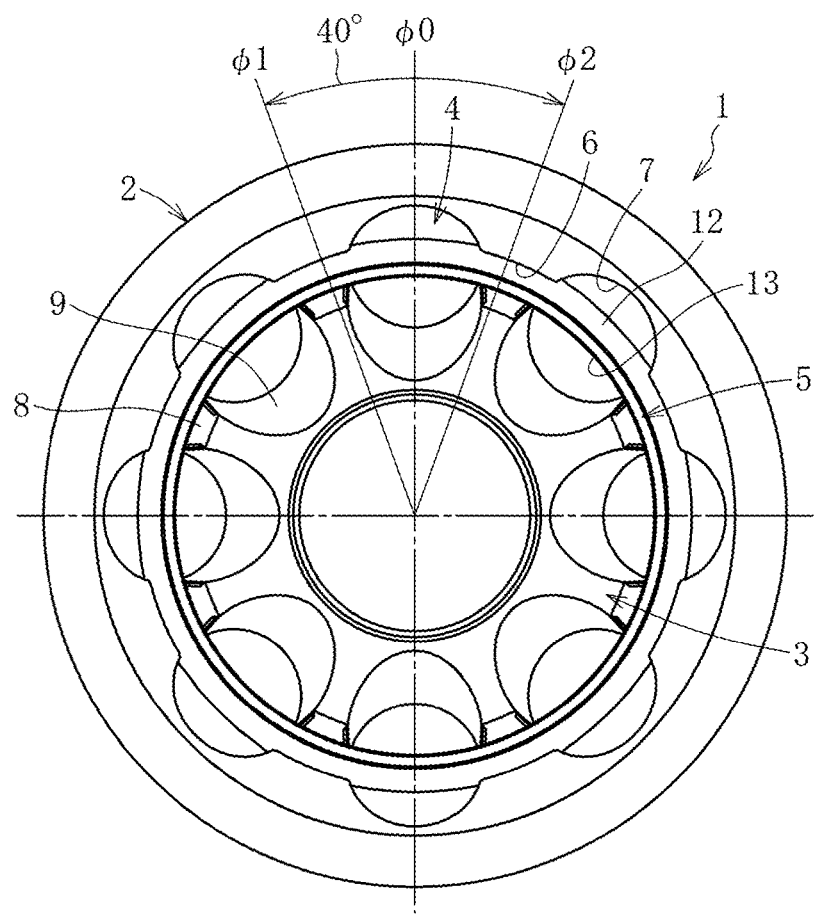
FIG. 5 is an illustration in which a range in which the torque transmission ball comes off the track groove of an outer joint member at the maximum operating angle is illustrated on FIG. 1b.

(1) The fixed type constant velocity universal joint 1 according to this embodiment has an operation mode in which, when a maximum operating angle is taken, the ball 4 that moves most toward an opening side of the track groove 7 of the outer joint member 2 comes off an end portion of the track groove 7 of the outer joint member 2 on the opening side to start a non-contact state with respect to the track groove 7 at a phase angle $\varphi 2$ (see FIG. 5) and returns to the end portion of the track groove 7 of the outer joint member 2 on the opening side to start a contact state with respect to the track groove 7 at a phase angle $\varphi 1$ (see FIG. 5).

(2) Under the state in which the maximum operating angle is taken, in a column portion 5b that is one of column portions 5b, 5b' on both sides of the pocket 5a of the cage 5 receiving the ball 4 at the phase angle $\varphi 1$ and is located on a side corresponding to a phase angle larger than the phase angle $\varphi 1$, a projection end portion Eo (see FIG. 12) obtained by projecting an end portion 6a (see FIG. 1a) of the spherical inner peripheral surface 6 of the outer joint member 2 on the opening side in a perpendicular direction toward the spherical outer peripheral surface 12 of the cage 5 and a projection end portion Ei (see FIG. 12) obtained by projecting an end portion 8a (see FIG. 1a) of the spherical outer peripheral surface 8 of the inner joint member 3 on a back side in a perpendicular direction toward the spherical inner peripheral surface 13 of the cage 5 at least partially overlap each other in the axial direction of the cage 5.

In Description and Claims, the end portion 6a of the spherical inner peripheral surface 6 of the outer joint member 2 on the opening side is a spherical surface edge of the spherical inner peripheral surface 6 on the opening side. When the spherical inner peripheral surface 6 and an inlet chamfer 20 are directly connected to each other, the end portion 6a corresponds to a contact point between the spherical inner peripheral surface 6 and the inlet chamfer 20. When a cylindrical cutout is formed between the spherical inner peripheral surface 6 and the inlet chamfer 20, the end portion 6a corresponds to a contact point between the spherical inner peripheral surface 6 and the cutout. Similarly, the end portion 8a of the spherical outer peripheral surface 8 of the inner joint member 3 on the back side is a spherical surface edge of the spherical outer peripheral surface 8 on the back side. When the spherical outer peripheral surface 8 and an end surface on the back side are directly connected to each other, the end portion 8a corresponds to a contact point between the spherical outer peripheral surface 8 and the end surface on the back side. When a chamfer is formed between the spherical outer peripheral surface 8 and the end surface on the back side, the end portion 8a corresponds to a contact point between the spherical outer peripheral surface 8 and the chamfer.

Figure 17B:
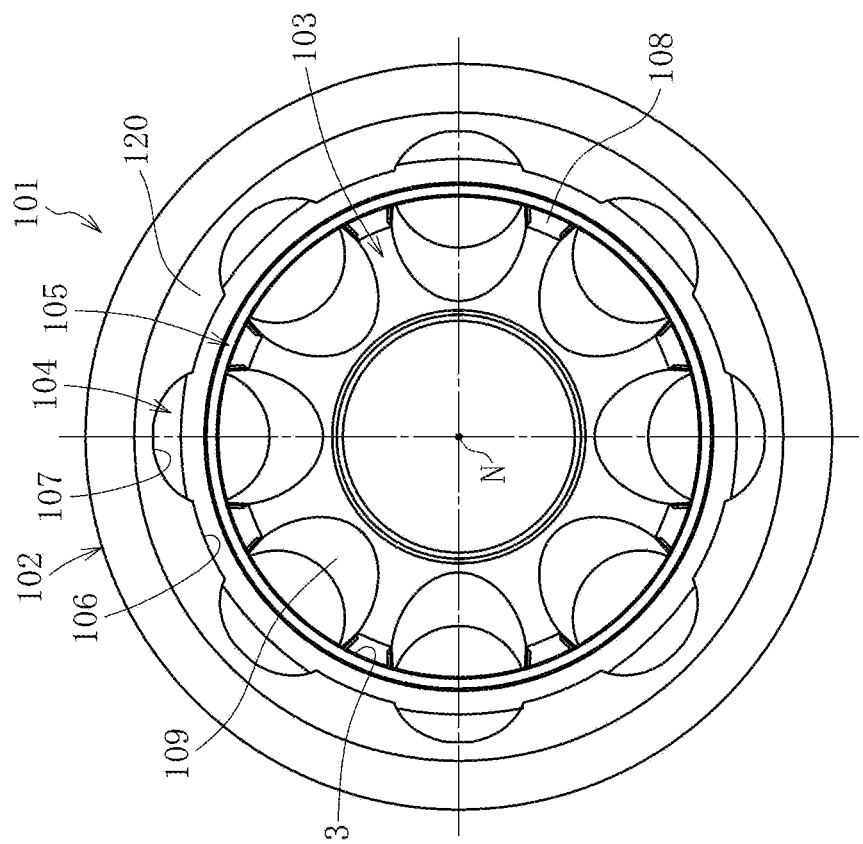
Figure 17A:
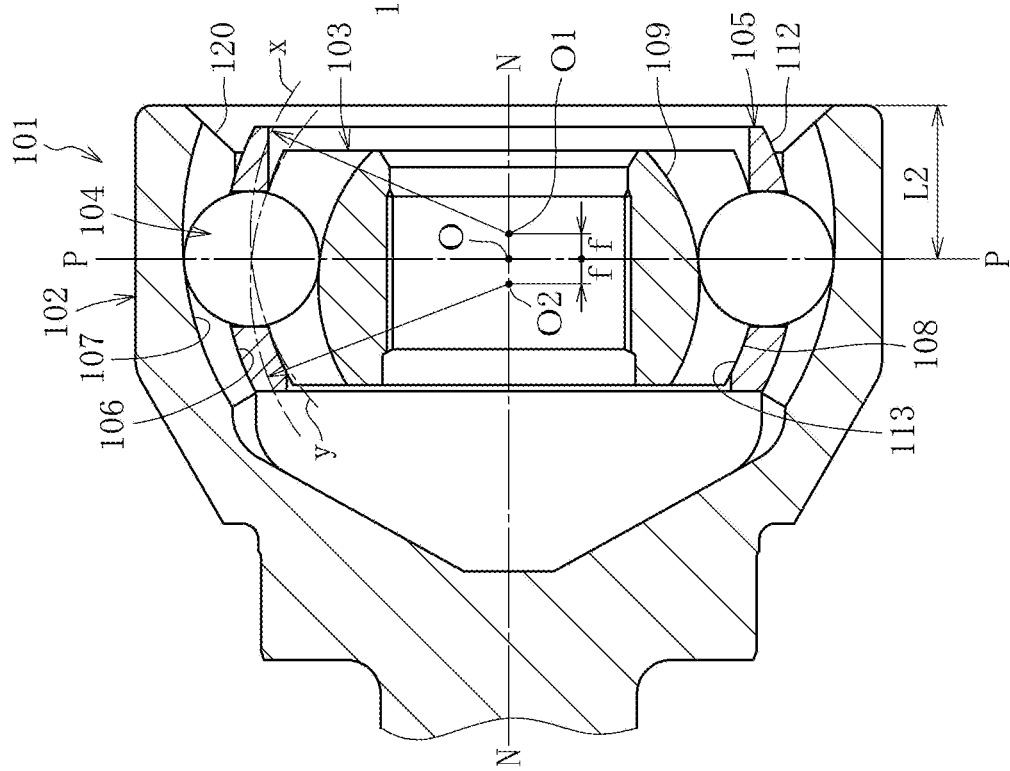
FIG. 17a is a longitudinal sectional view for illustrating an existing fixed type constant velocity universal joint.

First, the operation mode which is the above-mentioned characteristic configuration (1) of the fixed type constant velocity universal joint according to this embodiment is described through comparison with an existing fixed type constant velocity universal joint. FIG. 17a is a longitudinal sectional view for illustrating an existing Rzeppa fixed type constant velocity universal joint of an 8-ball type. FIG. 17b is a right-side view of FIG. 17a. A fixed type constant velocity universal joint 101 illustrated in FIG. 17a and FIG. 17b has a maximum operating angle of 47°. The fixed type constant velocity universal joint 101 mainly comprises an outer joint member 102, an inner joint member 103, balls 104, and a cage 105. Internal configurations of the fixed type constant velocity universal joint 101, specifically, curvature centers O1 and O2 of ball raceway center lines x and y of track grooves 107 and 109 of the outer joint member 102 and the inner joint member 103 and curvature centers of a spherical inner peripheral surface 106 and a spherical outer peripheral surface 108 are the same as those of the fixed type constant velocity universal joint 1 according to this embodiment, and hence description thereof is omitted.

The existing Rzeppa fixed type constant velocity universal joint 101 has an operation mode in which the balls 104 are always kept in a contact state with respect to the track grooves 107 of the outer joint member 102 up to the maximum operating angle (47°). An inlet chamfer 120 formed at an opening side end portion of the outer joint member 102 is set such that, at the maximum operating angle, an intermediate shaft (which is not shown, and is the same as the intermediate shaft 14 of FIG. 3a) does not interfere with the inlet chamfer 120 and that a contact state between the balls 104 and the track grooves 107 of the outer joint member 102 is kept. Therefore, a length L2 from the joint center O of the outer joint member 102 to the opening side end portion is set to be relatively long.

When a large operating angle with a maximum operating angle larger than 47° is required, the intermediate shaft interferes with the inlet chamfer 120. In order to avoid the interference, the inlet chamfer 120 is moved in the axial direction toward the joint center O, and an inclination angle is suitably increased. However, along with this, it is required that the axial length from the joint center O of the outer joint member 102 to the opening side end portion be reduced. The fixed type constant velocity universal joint 1 according to this embodiment meets this requirement, and the length L1, which is illustrated in FIG. 1a, from the joint center O of the outer joint member 2 to the opening side end portion is reduced to be smaller than the length L2, which is illustrated in FIG. 17a, from the joint center O of the outer joint member 102 of the existing fixed type constant velocity universal joint 101 to the opening side end portion.

As a result of adopting the configuration described above, the length of the track grooves 7 of the outer joint member 2 on the opening side is reduced, thereby achieving the operation mode of the fixed type constant velocity universal joint 1 according to this embodiment, that is, the operation mode in which, as illustrated in FIG. 5, when the maximum operating angle equal to or larger than that of the related art is taken, the ball 4 that moves most toward the opening side of the track groove 7 of the outer joint member 2 comes off the end portion of the track groove 7 of the outer joint member 2 on the opening side to start the non-contact state with respect to the track groove 7 at the phase angle φ2 and returns to the end portion of the track groove 7 of the outer joint member 2 on the opening side to start the contact state with respect to the track groove 7 at the phase angle φ1.

Figure 3B:
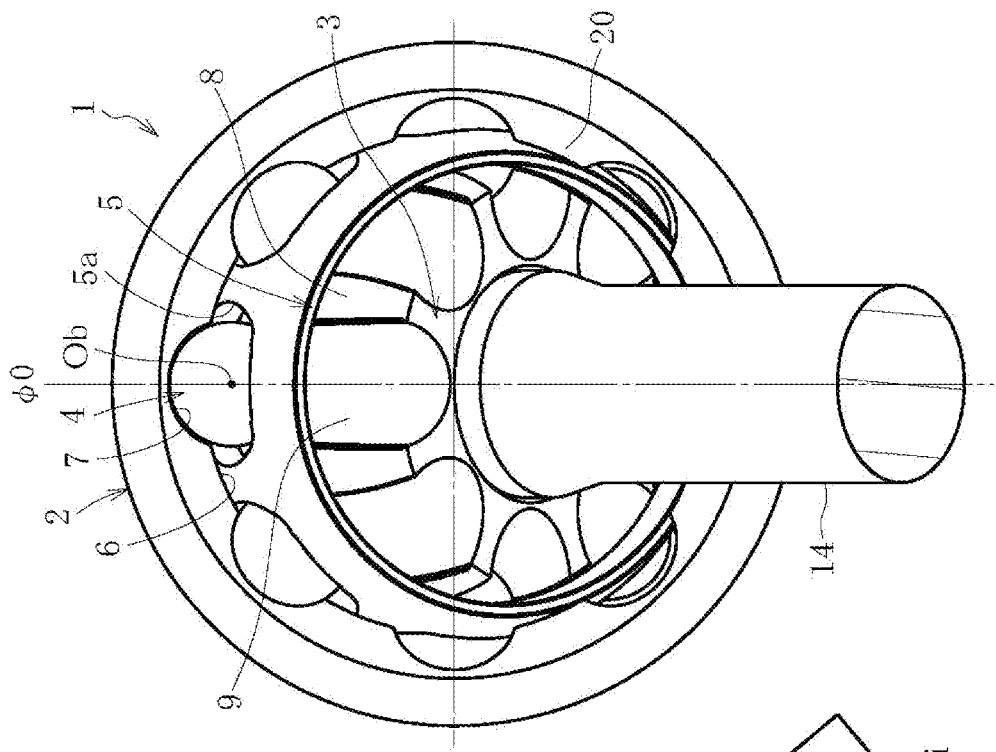
Figure 3A:
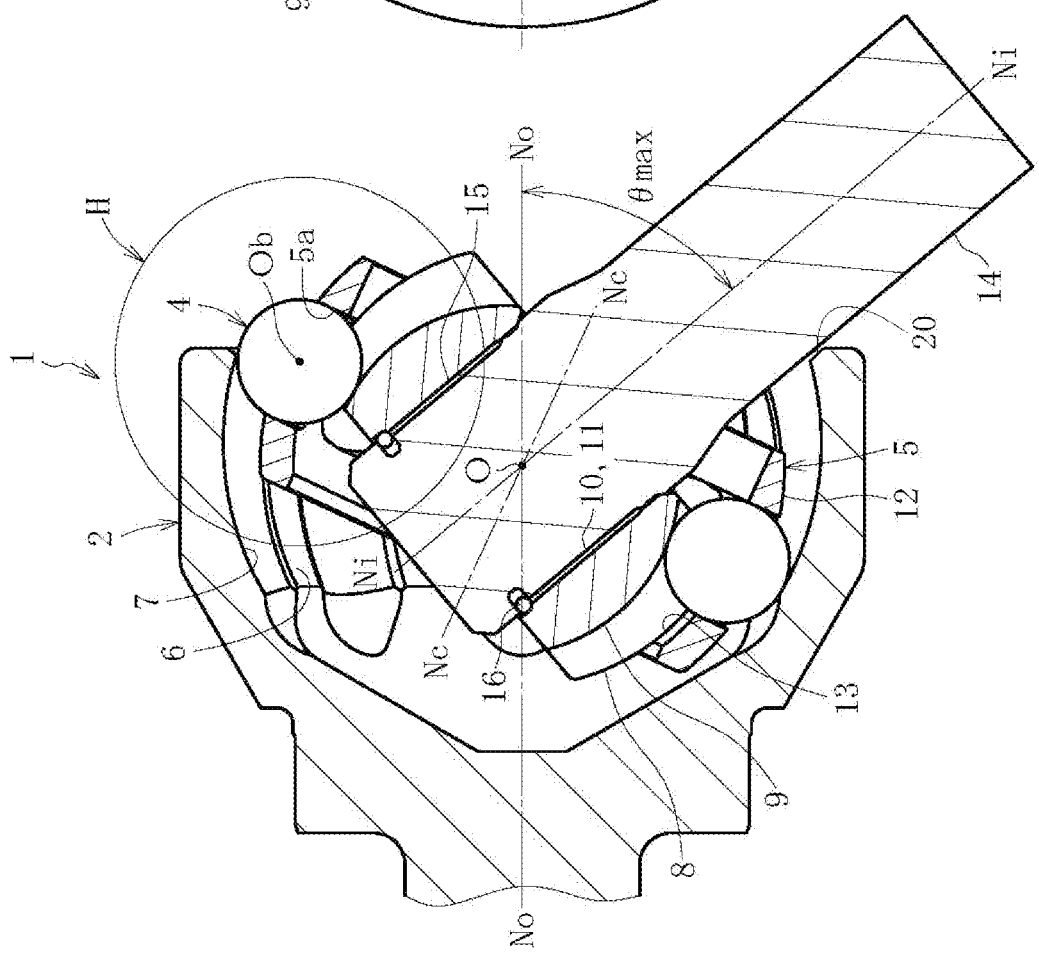
FIG. 3a is a longitudinal sectional view for illustrating a state in which the fixed type constant velocity universal joint of FIG. 1a and FIG. 1b takes a maximum operating angle.
Figure 4:
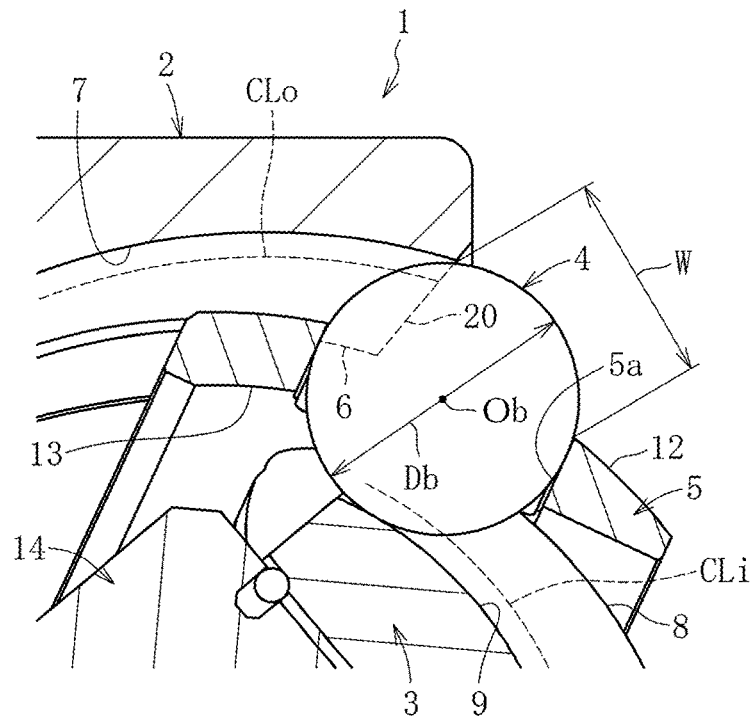

The state in which the fixed type constant velocity universal joint 1 having the operation mode described above takes the maximum operating angle is described with reference to FIG. 3a, FIG. 3b, and FIG. 4. FIG. 3a is a longitudinal sectional view for illustrating a state in which the fixed type constant velocity universal joint 1 of FIG. 1a and FIG. 1b takes the maximum operating angle. FIG. 3b is a right-side view of FIG. 3a. FIG. 4 is an enlarged longitudinal sectional view for illustrating the H portion of FIG. 3a.

FIG. 3a is an illustration of a state in which an axis Ni-Ni of the inner joint member 3 (intermediate shaft 14) is inclined with respect to an axis No-No of the outer joint member 2 to a maximum operating angle θ max (50°) on the drawing sheet of FIG. 3a. An axis Nc-Nc of the cage 5 is inclined at a bisecting angle θ max/2. The center Ob of the ball 4 is located on the drawing sheet of FIG. 3a, and the ball 4 on the upper side of FIG. 3a is located at a phase angle φ=0°. This phase angle is indicated by "φ0" in Description (see FIG. 3b). In Description, the phase angle φ is indicated as proceeding in a counterclockwise direction from the phase angle φ0. Moreover, in Description and Claims, the term "maximum operating angle" is used with the meaning of a maximum operating angle that is allowed at the time of using the fixed type constant velocity universal joint 1.

In FIG. 3a, illustration is given of a state in which the intermediate shaft 14 abuts against the inlet chamfer 20 at the time of the maximum operating angle. However, in reality, the inlet chamfer 20 is set so as to have such a shape and a dimension that a slight margin is given with respect to a radially outer surface of the intermediate shaft 14 when the maximum operating angle is taken. The inlet chamfer 20 functions as a stopper surface for a case in which the intermediate shaft 14 exceeds the maximum operating angle.

As illustrated in FIG. 3a, in the fixed type constant velocity universal joint 1 according to this embodiment, when the maximum operating angle is taken, the ball 4 at the phase angle φ0 that moves most toward the opening side of the track groove 7 of the outer joint member 2 comes off the end portion (inlet chamfer 20) of the track groove 7 of the outer joint member 2 on the opening side to be brought into the non-contact state with respect to the track groove 7. Details of this state are described with reference to FIG. 4, which is an enlarged view of the H portion of FIG. 3a.

In FIG. 4, the inlet chamber 20, which is formed at the end portion of the outer joint member 2 on the opening side, and the spherical inner peripheral surface 6 are indicated by broken lines. Moreover, a contact locus obtained by connecting contacts C2 (or C1, see FIG. 2), which are given between the track groove 7 of the outer joint member 2 and the ball 4, in the axial direction is denoted by CLo, and a contact locus obtained by connecting contacts C3 (or C4, see FIG. 2), which are given between the track groove 9 of the inner joint member 3 and the ball 4, in the axial direction is denoted by CLi. The contact locus CLo and the contact locus CLi are each indicated by a broken line. The contact loci CLo and CLi are formed at positions apart from the groove bottoms of the track grooves 7 and 9, respectively.

The contact locus CLo extends in the axial direction toward the opening side of the outer joint member 2 and ends at an edge portion of the inlet chamfer 20. This edge portion of the inlet chamfer 20 is the end portion of the track groove 7 of the outer joint member 2 on the opening side. The ball 4 comes off the end of the contact locus CLo rightward in FIG. 4, and the ball 4 and the track groove 7 are in the non-contact state. The ball 4 that is in the non-contact state with respect to the track groove 7 is one of the eight balls 4, and the one ball 4 is not involved in torque transmission. The contact locus CLi of the track groove 9 of the inner joint member 3 extends to the position of the ball 4. That is, it is only required that the contact locus CLi of the track groove 9 of the inner joint member 3 be secured when the ball 4 moves to the end of the contact locus CLo of the track groove 7 of the outer joint member 2.

The ball 4 comes off the end portion of the track groove 7 of the outer joint member 2 on the opening side to be brought into the non-contact state with respect to the track groove 7. However, a distance W between the edge portion of the inlet chamfer 20 of the track groove 7 and an edge portion of the pocket 5a of the cage 5 is set so as to have a relationship of Db>W with a diameter Db of the ball 4, and hence the ball 4 is prevented from being dropped off from the pocket 5a of the cage 5.

As described above, at the maximum operating angle, the ball 4 at the phase angle φ0 comes off the track groove 7 of the outer joint member 2 to be brought into the non-contact state. Next, the range in which the ball 4 comes off the track groove 7, that is, the range of the phase angle in which the ball 4 and the track groove 7 are brought into the non-contact state is described with reference to FIG. 3a, FIG. 3b, and FIG. 5. FIG. 5 is an illustration in which the range in which the ball 4 comes off the track groove 7 of the outer joint member 2 at the maximum operating angle is illustrated on FIG. 1b. In FIG. 5, the range in which the ball 4 comes off the track groove 7 of the outer joint member 2 is indicated by the arrows. Specifically, the fixed type constant velocity universal joint 1 according to this embodiment has the maximum operating angle of 50°. With the phase angle $\varphi 0$ at the center, an angle of 20° is given between the phase angle $\varphi$ and the phase angle $\varphi 1$, and an angle of 0° is given between the phase angle $\varphi$ and the phase angle $\varphi 2$. The range in which the ball 4 comes off the track groove 7 of the outer joint member 2 is 40°.

A supplementary description is given of the range in which the ball 4 comes off the track groove 7, that is, the range of the phase angle in which the ball 4 and the track groove 7 are brought into the non-contact state, using one ball 4 located at the phase angle $\varphi 0$ in FIG. 3a and FIG. 3b as an example. Under a state in which the axis No-No of the outer joint member 2 and the axis Ni-Ni of the inner joint member 3 (intermediate shaft 14) illustrated in FIG. 3a and FIG. 3b are fixed, when the fixed type constant velocity universal joint 1 is rotated in the counterclockwise direction from the phase angle $\varphi 0$, at the position of the phase angle $\varphi 1$ ($\varphi 1=20°$) in FIG. 5, the ball 4 returns to the end portion of the track groove 7 of the outer joint member 2 on the opening side to start the contact state with respect to the track groove 7. Further, as the rotation in the counterclockwise direction continues, at the position of the phase angle $\varphi 2$ ($\varphi 2=340°$) before the phase angle $\varphi 0$, the ball 4 comes off the end portion of the track groove 7 of the outer joint member 2 on the opening side to start the non-contact state with respect to the track groove 7. In the description above, the specific one ball 4 is described as an example. However, in actuality, when the fixed type constant velocity universal joint 1 is rotated, the eight balls 4 sequentially pass through the range of the phase angle in which the balls 4 are brought into the non-contact state.

Next, a positional relationship among the spherical inner peripheral surface of the outer joint member, the spherical outer peripheral surface of the inner joint member, and the cage, which is the characteristic configuration (2) of the fixed type constant velocity universal joint 1 according to this embodiment, is described. First, the knowledge obtained in the course of development for this embodiment is described. The fixed type constant velocity universal joint 1 has the operation mode in which, when the maximum operating angle is taken, the ball 4 that moves most toward the opening side of the track groove 7 of the outer joint member 2 comes off the end portion of the track groove 7 of the outer joint member 2 on the opening side to start the non-contact state with respect to the track groove 7 at the phase angle $\varphi 2$ and returns to the end portion of the track groove 7 of the outer joint member 2 on the opening side to start the contact state with respect to the track groove 7 at the phase angle $\varphi 1$. Therefore, in order to secure the strength of the cage 5, a track load given when the maximum operating angle is taken was studied. The track load was analyzed with use of the Rzeppa fixed type constant velocity universal joint of the 8-ball type having the operation mode in which the balls and the track grooves of the outer joint member are always kept in the contact state at the maximum operating angle of 50° as a model. A result of the analysis is shown in FIG. 6.

Figure 6:
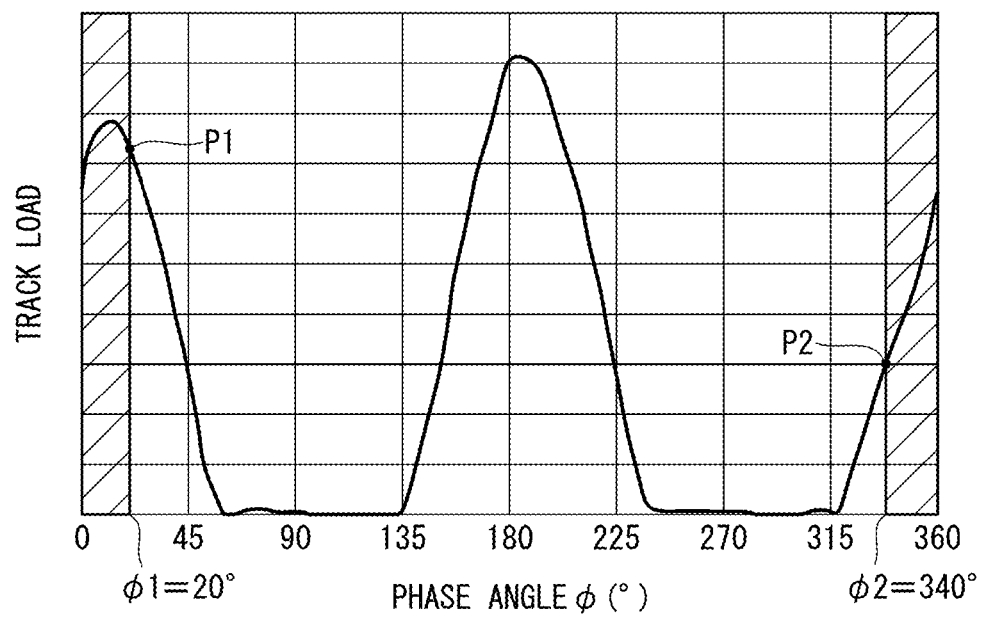
FIG. 6 is a graph for showing a relationship between a phase angle and a track load at the time of the maximum operating angle.

In FIG. 6, the result of the analysis of the phase angle and the track load for one ball 4 in the above-mentioned model at the time of the maximum operating angle is indicated by a thick line. In FIG. 6, hatched portions indicating the range of the phase angle in which the ball 4 and the track groove 7 of the outer joint member 2 are brought into the non-contact state are shown in a superimposed manner. Based on the result of the analysis shown in FIG. 6, consideration is given of the relationship between the phase angle and the track load in the fixed type constant velocity universal joint 1 according to this embodiment as follows.

In the fixed type constant velocity universal joint 1 according to this embodiment, as mentioned above, the ball 4 that is located within the range of the phase angle in which the ball 4 and the track groove 7 are brought into the non-contact state at the time of the maximum operating angle is one of the eight balls 4. Moreover, the result of the analysis of FIG. 6 was studied, and the following result was obtained. That is, concerning the track load given immediately before the ball 4 comes off the end portion of the track groove 7 of the outer joint member 2 on the opening side at the phase angle $\varphi 2$, all of the eight balls 4 are in the contact state with respect to the track grooves 7, and hence the track load at the phase angle $\varphi 2$ given in the result of the analysis shown in FIG. 6 can be regarded as the track load at the phase angle $\varphi 2$ in the fixed type constant velocity universal joint 1 according to this embodiment. Similarly, concerning the track load given immediately after the ball 4 returns to the end portion of the track groove 7 of the outer joint member 2 on the opening side at the phase angle $\varphi 1$, all of the eight balls 4 are in the contact state with respect to the track grooves 7, and hence the track load at the phase angle $\varphi 1$ given in the result of the analysis shown in FIG. 6 can be regarded as the track load at the phase angle $\varphi 1$ in the fixed type constant velocity universal joint 1 according to this embodiment.

Based on the result of the consideration described above, the result of the analysis shown in FIG. 6 was evaluated. As a result, it was found that a track load P1 given when the ball 4 returns to the end portion of the track groove 7 of the outer joint member 2 on the opening side to start the contact state with respect to the track groove 7 at the phase angle $\varphi 1$ is significantly larger than a track load P2 given when the ball 4 comes off the end portion of the track groove 7 of the outer joint member 2 on the opening side to start the non-contact state with respect to the track groove 7 at the phase angle $\varphi 2$. Therefore, a large push-out force in the axial direction acts on the cage 5 from the ball 4 that is sandwiched between the track groove 7 of the outer joint member 2 and the track groove 9 of the inner joint member 3 at the phase angle $\varphi 1$, thereby generating a large spherical force between the spherical inner peripheral surface 6 of the outer joint member 2 and the spherical outer peripheral surface 12 of the cage 5 and between the spherical outer peripheral surface 8 of the inner joint member 3 and the spherical inner peripheral surface 13 of the cage 5. A focus is given to this problem, and various considerations were made as follows in order to secure the strength of the cage 5.

Figure 7:
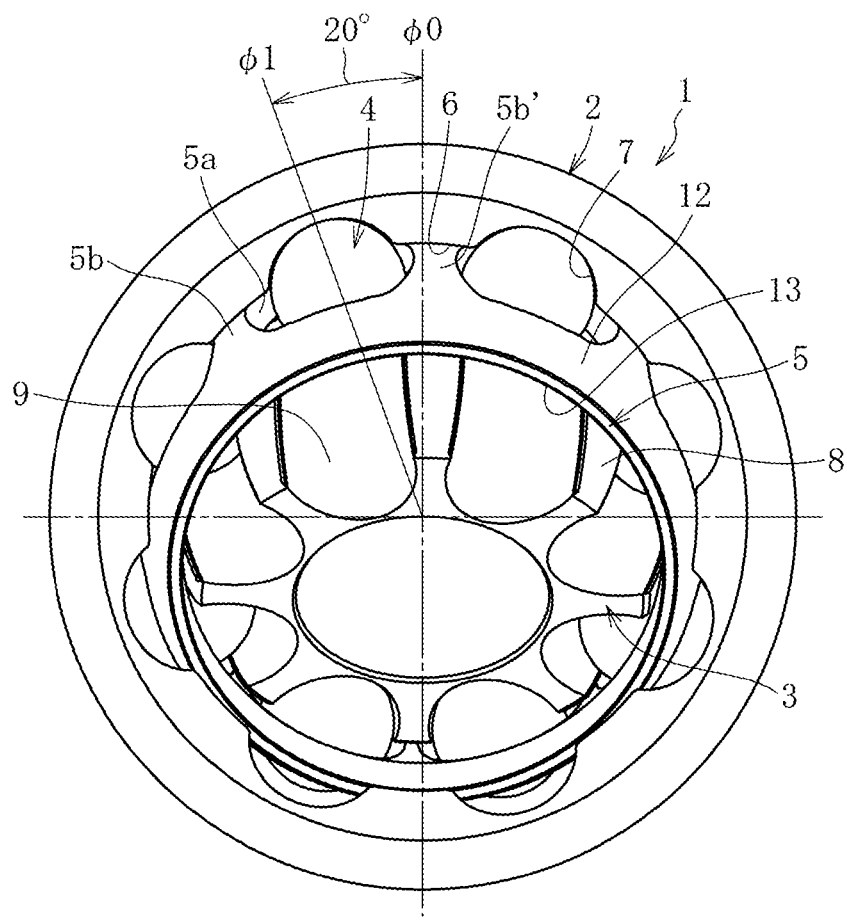
FIG. 7 is a right-side view for illustrating a state in which the ball returns to an end portion of the track groove of the outer joint member on an opening side at a phase angle φ1 to start contact with the track groove.

As illustrated in FIG. 7, the ball 4 returns to the end portion of the track groove 7 of the outer joint member 2 on the opening side to start the contact state with respect to the track groove 7 at the phase angle $\varphi 1$. It was found that the following actions occur when the fixed type constant velocity universal joint 1 rotates in the counterclockwise direction. That is, the track load acts on the contacts C1 and C3 between the balls 4 and the track grooves 7 and 9 in the direction inclined in the counterclockwise direction at the contact angle $\alpha$ with respect to the straight line passing through the center Ob of the ball 4 and the joint center O as illustrated in FIG. 2. Moreover, the distribution and balance of the track load change when the ball 4 is brought into the non-contact state. Further, for example, due to the influence of internal forces having different magnitudes such as the track loads P1 and P2, the column portion 5b that is one of the column portions 5b and 5b' on both sides of the pocket 5a of the cage 5 receiving the ball 4 at the phase angle φ1 as illustrated in FIG. 7 and is located on the side corresponding to the phase angle larger than the phase angle φ1 receives the above-mentioned large spherical force from the spherical inner peripheral surface 6 of the outer joint member 2 and the spherical outer peripheral surface 8 of the inner joint member 3.

Based on the knowledge described above, the inventors of the present invention hit on the idea of setting a positional relationship of the end portion 6a of the spherical inner peripheral surface 6 of the outer joint member 2 on the opening side (see FIG. 1a) and the end portion 8a of the spherical outer peripheral surface 8 of the inner joint member 3 on the back side with respect to the column portion 5b that is one of the column portions 5b, 5b' on both sides of the pocket 5a of the cage 5 receiving the ball 4 at the phase angle φ1 and is located on the side corresponding to the phase angle larger than the phase angle φ1 (left side of FIG. 7) so that the column portion 5b is prevented from being brought into the shear state caused by the above-mentioned large spherical force, thereby achieving this embodiment.

The fixed type constant velocity universal joint 1 according to this embodiment has the characteristic configuration (2) that, under the state in which the maximum operating angle is taken, in the column portion 5b that is one of the column portions 5b and 5b' on both sides of the pocket 5a of the cage 5 receiving the ball 4 at the phase angle φ1 and is located on the side corresponding to the phase angle larger than the phase angle φ1, the projection end portion Eo (see FIG. 12) obtained by projecting the end portion 6a of the spherical inner peripheral surface 6 of the outer joint member 2 on the opening side in the perpendicular direction toward the spherical outer peripheral surface 12 of the cage 5 and the projection end portion Ei (see FIG. 12) obtained by projecting the end portion 8a of the spherical outer peripheral surface 8 of the inner joint member 3 on the back side in the perpendicular direction toward the spherical inner peripheral surface 13 of the cage 5 at least partially overlap each other in the axial direction of the cage 5.

In FIG. 7, description is made of the example case in which the fixed type constant velocity universal joint 1 rotates in the counterclockwise direction, and the column portion 5b that is one of the column portions 5b and 5b' on both sides of the pocket 5a of the cage 5 receiving the ball 4 at the phase angle φ1 and is located on the side corresponding to the phase angle larger than the phase angle φ1 corresponds to the column portion 5b. However, when the rotation direction is reversed (clockwise direction), the column portion that is located on the side corresponding to the phase angle larger than the phase angle φ1 corresponds to the column portion 5b'. In Description and Claims, the column portion that is located on the side corresponding to the phase angle larger than the phase angle φ1 is defined as described above.

Figure 8C:
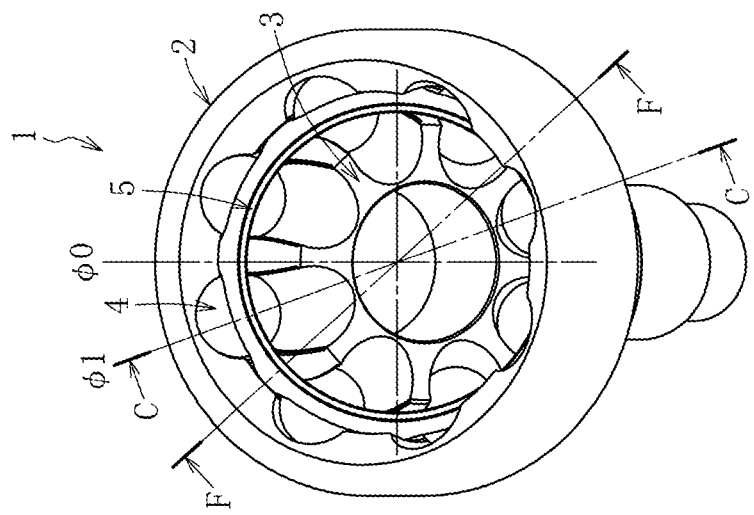
FIG. 8c is a right-side view for illustrating the state in which the torque transmission ball returns to the track groove of the outer joint member at the maximum operating angle, and is an illustration in which an axis of the cage is fixed in a horizontal state.
Figure 8B:
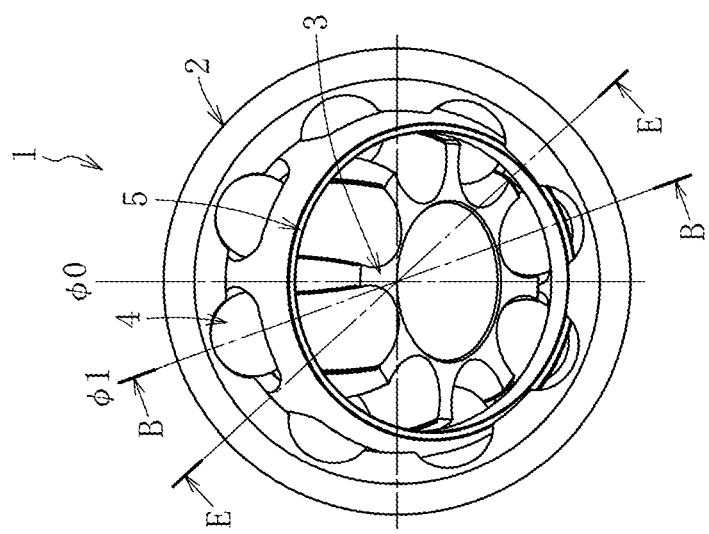
FIG. 8b is a right-side view for illustrating a state in which the torque transmission ball returns to the track groove of the outer joint member at the maximum operating angle, and is an illustration in which an axis of the outer joint member is fixed in a horizontal state.
Figure 8A:
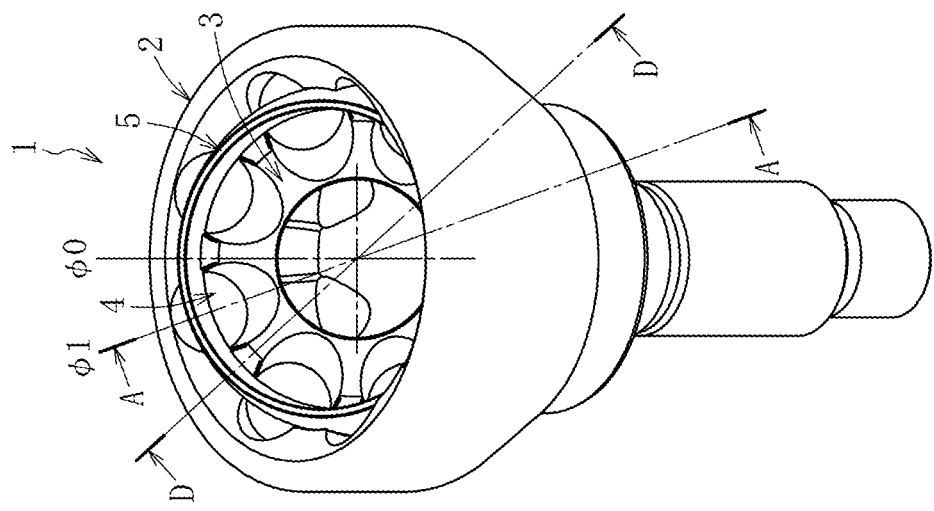
FIG. 8a is a right-side view for illustrating a state in which the torque transmission ball returns to the track groove of the outer joint member at the maximum operating angle, and is an illustration in which an axis of an inner joint member is fixed in a horizontal state.
Figure 9:
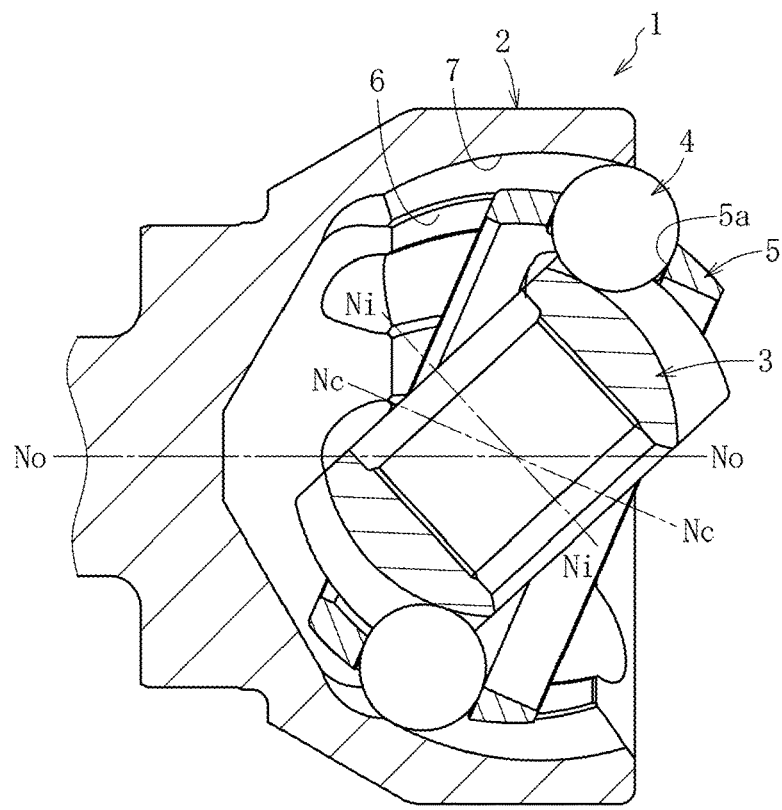
FIG. 9 is a longitudinal sectional view for illustrating a longitudinal cross section of a fixed type constant velocity universal joint at a groove bottom of the track groove at the phase angle φ1 at which the torque transmission ball returns to the track groove of the outer joint member, and is an illustration in which a longitudinal cross section of the inner joint member taken along the line A-A of FIG. 8a and seen from the direction indicated by the arrows, a longitudinal cross section of the outer joint member taken along the line B-B of FIG. 8b and seen from the direction indicated by the arrows, a longitudinal cross section of the cage taken along the line C-C of FIG. 8c and seen from the direction indicated by the arrows, and torque transmission balls are combined on the drawing sheet.
Figure 10:
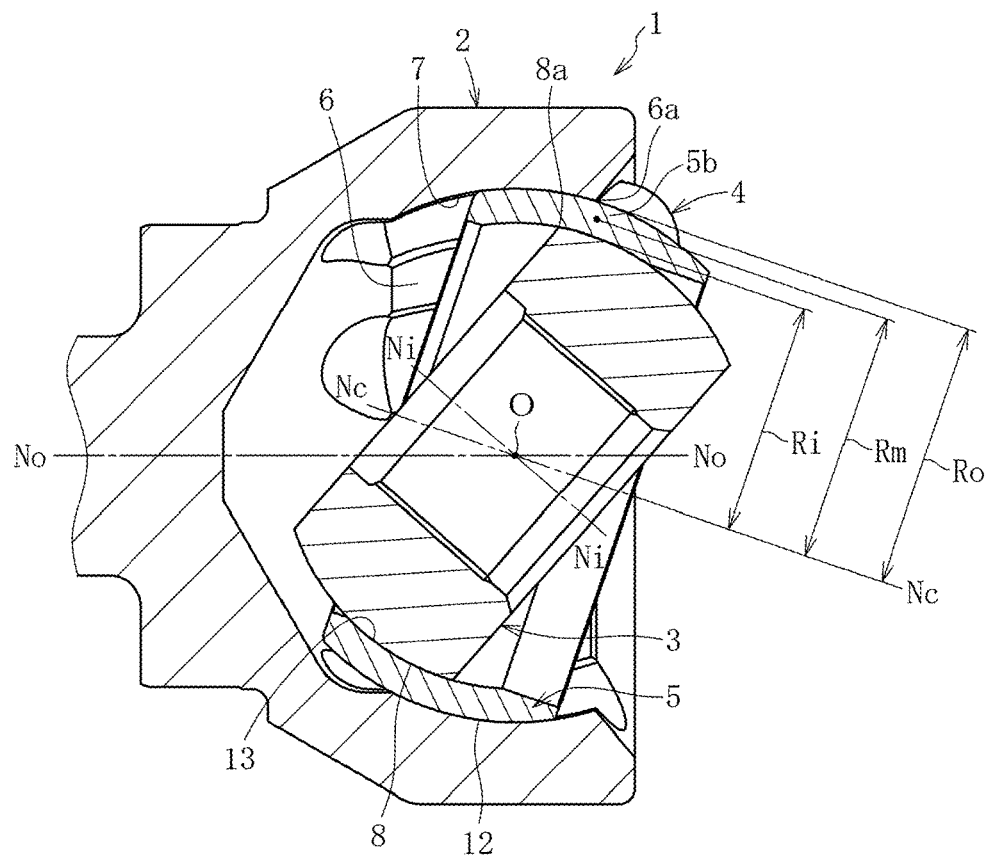
FIG. 10 is a longitudinal sectional view for illustrating a longitudinal cross section of the fixed type constant velocity universal joint at a circumferential center of a column portion of the cage on a side corresponding to a phase angle larger than the phase angle φ1 at which the torque transmission ball returns to the track groove of the outer joint member, and is an illustration in which a longitudinal cross section of the inner joint member taken along the line D-D of FIG. 8a and seen from the direction indicated by the arrows, a longitudinal cross section of the outer joint member taken along the line E-E of FIG. 8b and seen from the direction indicated by the arrows, and a longitudinal cross section of the cage taken along the line F-F of FIG. 8c and seen from the direction indicated by the arrows are combined on the drawing sheet.

The characteristic configuration (2) described above is specifically described with reference to FIGS. 8 to FIG. 12. FIG. 8a is a right-side view for illustrating the state in which the ball returns to the track groove of the outer joint member at the maximum operating angle, and is an illustration in which the axis of the inner joint member is held in a horizontal state. FIG. 8b is a right-side view for illustrating a state in which the axis of the outer joint member is held in a horizontal state. FIG. 8c is a right-side view for illustrating a state in which the axis of the cage is held in a horizontal state. FIG. 9 is a longitudinal sectional view for illustrating a longitudinal cross section of the fixed type constant velocity universal joint at a groove bottom of the track groove at the phase angle φ1 at which the ball returns to the track groove of the outer joint member, and is an illustration in which a longitudinal cross section of the inner joint member taken along the line A-A of FIG. 8a and seen from the direction indicated by the arrows, a longitudinal cross section of the outer joint member taken along the line B-B of FIG. 8b and seen from the direction indicated by the arrows, a longitudinal cross section of the cage taken along the line C-C of FIG. 8c and seen from the direction indicated by the arrows, and the balls are combined on the drawing sheet. FIG. 10 is a longitudinal sectional view for illustrating a longitudinal cross section of the fixed type constant velocity universal joint at a circumferential center of the column portion 5b of the cage on the side corresponding to the phase angle larger than the phase angle φ1 at which the ball returns to the track groove of the outer joint member, and is an illustration in which a longitudinal cross section of the inner joint member taken along the line D-D of FIG. 8a and seen from the direction indicated by the arrows, a longitudinal cross section of the outer joint member taken along the line E-E of FIG. 8b and seen from the direction indicated by the arrows, and a longitudinal cross section of the cage taken along the line F-F of FIG. 8c and seen from the direction indicated by the arrows are combined on the drawing sheet.

As illustrated in FIG. 8a, FIG. 8b, FIG. 8c, and FIG. 9, when the maximum operating angle is taken, the ball 4 returns to the track groove 7 of the outer joint member 2 to start the contact state with respect to the track groove 7 at the phase angle φ1. At this time, the ball 4 comes into contact with the edge portion of the inlet chamfer 20 on the contact locus CLo of FIG. 4. As mentioned above, the track load P1 of the ball 4 is significantly larger than the track load P2 given when the ball 4 comes off the end portion of the track groove 7 of the outer joint member 2 on the opening side to start the non-contact state with respect to the track groove 7 at the phase angle φ2.

As illustrated in FIG. 8a, FIG. 8b, FIG. 8c, and FIG. 10, the column portion 5b of the cage that is located on the side corresponding to the phase angle larger than the phase angle φ1 at which the ball returns to the track groove of the outer joint member is sandwiched between the end portion 6a of the spherical inner peripheral surface 6 of the outer joint member 2 on the opening side and the end portion 8a of the spherical outer peripheral surface 8 of the inner joint member 3 on the back side, and the large spherical force acts on the column portion from both end portions. However, as illustrated in FIG. 10, the fixed type constant velocity universal joint 1 according to this embodiment has an overlapping portion T (see FIG. 12) at which the end portion 6a of the spherical inner peripheral surface 6 of the outer joint member 2 on the opening side and the end portion 8a of the spherical outer peripheral surface 8 of the inner joint member 3 on the back side overlap each other in the axial direction of the column portion 5b of the cage 5, and hence the column portion 5b is prevented from being brought into the shear state caused by the spherical force.

Figure 11B:
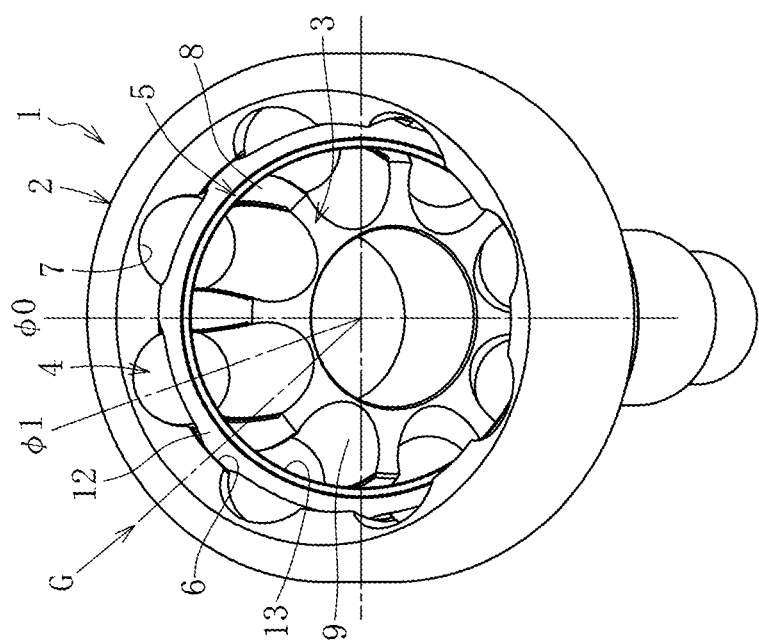
Figure 11A:
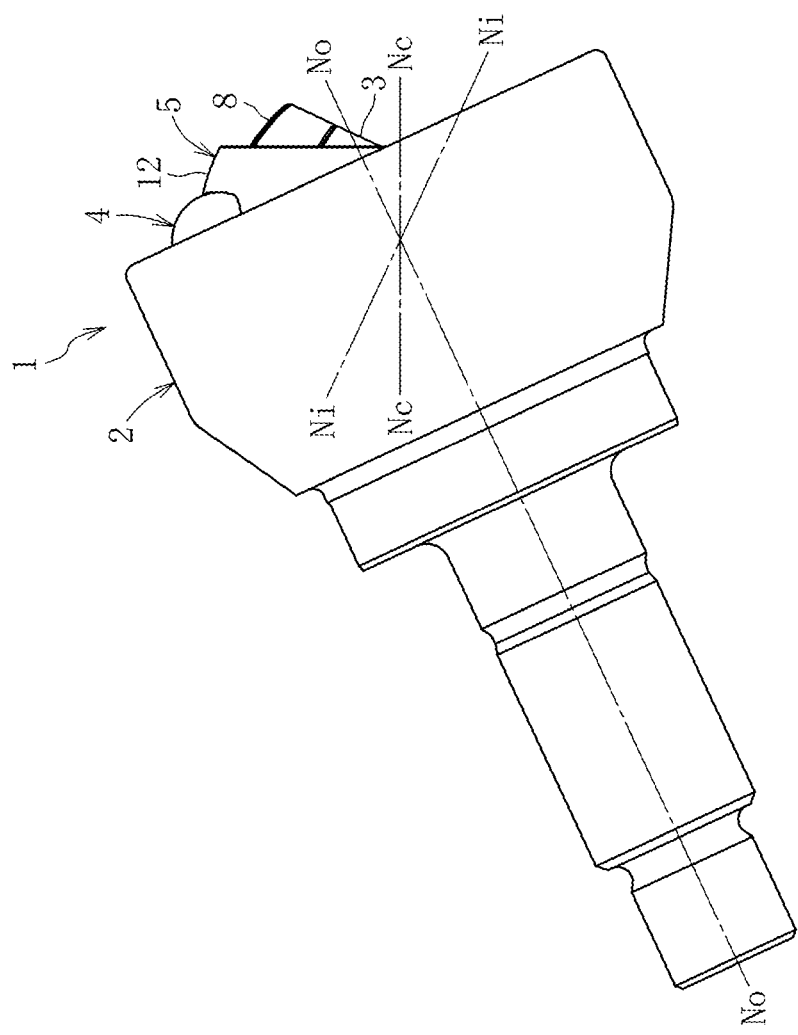
FIG. 11a is a front view for illustrating the fixed type constant velocity universal joint when the torque transmission ball returns to the track groove of the outer joint member.
Figure 12:
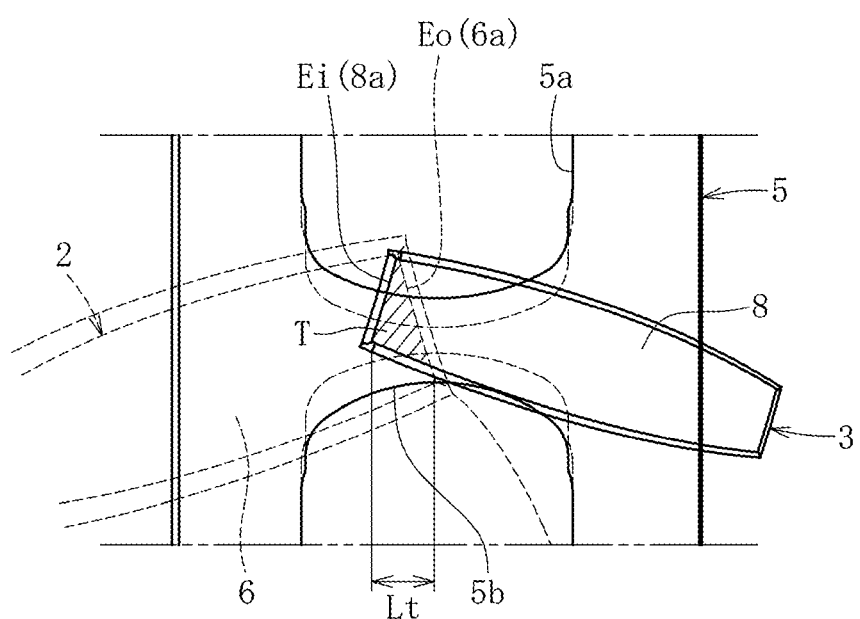
FIG. 12 is an illustration of a relationship among a spherical inner peripheral surface of the outer joint member, a spherical outer peripheral surface of the inner joint member, and the cage as seen in the G direction indicated by the arrow in FIG. 11b.

Details of the state in which the end portion 6a of the spherical inner peripheral surface 6 of the outer joint member 2 on the opening side and the end portion 8a of the spherical outer peripheral surface 8 of the inner joint member 3 on the back side overlap each other are described with reference to FIG. 11a, FIG. 11b, and FIG. 12. FIG. 11a is a front view for illustrating the fixed type constant velocity universal joint when the torque transmission ball returns to the track groove of the outer joint member. FIG. 11b is a right-side view of FIG. 11a. FIG. 12 is an illustration of a relationship among the spherical inner peripheral surface of the outer joint member, the spherical outer peripheral surface of the inner joint member, and the cage as seen in the G direction indicated by the arrow in FIG. 11b.

In FIG. 11a and FIG. 11b, the fixed type constant velocity universal joint is illustrated with the axis of the cage 5 arranged so as to extend in the horizontal direction. FIG. 11b corresponds to FIG. 8c mentioned above. In FIG. 12, the spherical inner peripheral surface 6 of the outer joint member 2 is indicated by broken lines, and the spherical outer peripheral surface 8 of the inner joint member 3 is indicated by solid lines. Regarding the cage 5, contour lines on the spherical outer peripheral surface 12 side are illustrated with solid lines, and contour lines on the spherical inner peripheral surface 13 side are illustrated with broken lines.

As illustrated in FIG. 12, the projection end portion obtained by projecting the end portion 6a of the spherical inner peripheral surface 6 of the outer joint member 2 on the opening side in the perpendicular direction toward the spherical outer peripheral surface 12 of the cage 5 corresponds to the projection end portion Eo. The projection end portion obtained by projecting the end portion 8a of the spherical outer peripheral surface 8 of the inner joint member 3 on the back side in the perpendicular direction toward the spherical inner peripheral surface 13 of the cage 5 corresponds to the projection end portion Ei. The projection end portion Eo and the projection end portion Ei at least partially overlap each other in the axial direction of the cage 5. The projection end portion Eo and the projection end portion Ei overlap each other in a triangular shape. The overlapping portion T having the triangular shape has a length Lt in the axial direction of the cage 5. The descriptions of "the projection end portion (Eo) obtained by projecting the end portion of the spherical inner peripheral surface of the outer joint member on the opening side in the perpendicular direction toward the spherical outer peripheral surface of the cage and the projection end portion (Ei) obtained by projecting the end portion of the spherical outer peripheral surface of the inner joint member on the back side in the perpendicular direction toward the spherical inner peripheral surface of the cage at least partially overlap each other in the axial direction of the cage" and "a length Lt of the overlapping portion in the axial direction of the cage" in Claims have the meaning defined above.

Moreover, description is made of the characteristic configuration (2) that, under the state in which the maximum operating angle is taken, in the column portion 5b that is one of the column portions 5b and 5b' on both sides of the pocket 5a of the cage 5 receiving the ball 4 at the phase angle φ1 and is located on the side corresponding to the phase angle larger than the phase angle φ1, the projection end portion Eo obtained by projecting the end portion 6a of the spherical inner peripheral surface 6 of the outer joint member 2 on the opening side in the perpendicular direction toward the spherical outer peripheral surface 12 of the cage 5 and the projection end portion Ei obtained by projecting the end portion 8a of the spherical outer peripheral surface 8 of the inner joint member 3 on the back side in the perpendicular direction toward the spherical inner peripheral surface 13 of the cage 5 at least partially overlap each other in the axial direction of the cage 5. However, depending on use conditions such as an operating angle and a load torque of the fixed type constant velocity universal joint 1, adjustment may be made such that the projection end portion Eo and the projection end portion Ei at least partially overlap each other in the axial direction of the cage 5 under a state in which a large operating angle which is smaller than the maximum operating angle by several degrees (for example, from 2° to 5°) is taken. The maximum operating angle described in Description and Claims includes the meaning described above.

The projection end portion Eo and the projection end portion Ei at least partially overlap each other in the axial direction of the cage 5. Therefore, the column portion 5b is prevented from being brought into the shear state caused by the spherical force. Thus, the strength of the cage 5 can be secured, and an increase in weight can be suppressed.

Description is made of a setting range of the overlapping portion T between the projection end portion Eo and the projection end portion Ei. As illustrated in FIG. 10, when there are given Ro representing a radius of the spherical outer peripheral surface 12 of the cage 5, Ri representing a radius of the spherical inner peripheral surface 13, and Rm representing a radius of the center of the cage 5 in the radial thickness direction, Rm=(Ro+Ri)/2 is satisfied. It is preferred that a ratio Lt/Rm of the length Lt of the overlapping portion T in the axial direction of the cage 5 to the radius Rm of the center of the cage 5 in the radial thickness direction be set to be equal to or more than 0.03. When the ratio Lt/Rm is less than 0.03, a surface pressure at the overlapping portion T becomes higher, with the result that the shear state of the column portion 5b cannot be sufficiently suppressed.

Figure 14A:
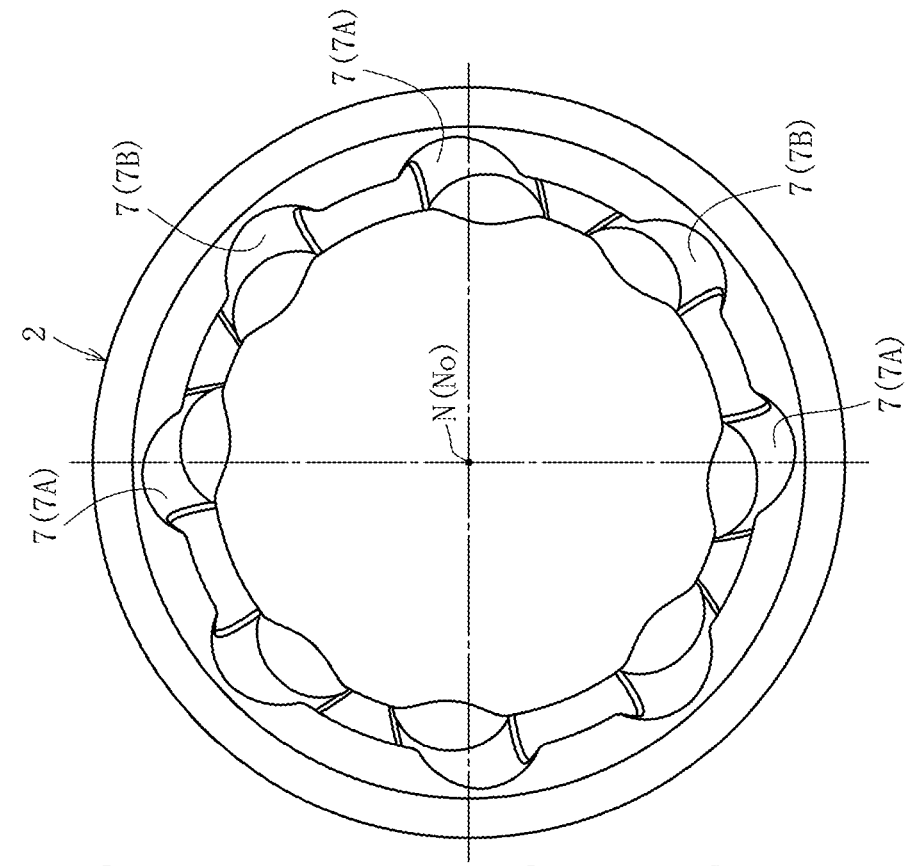
Figure 14B:
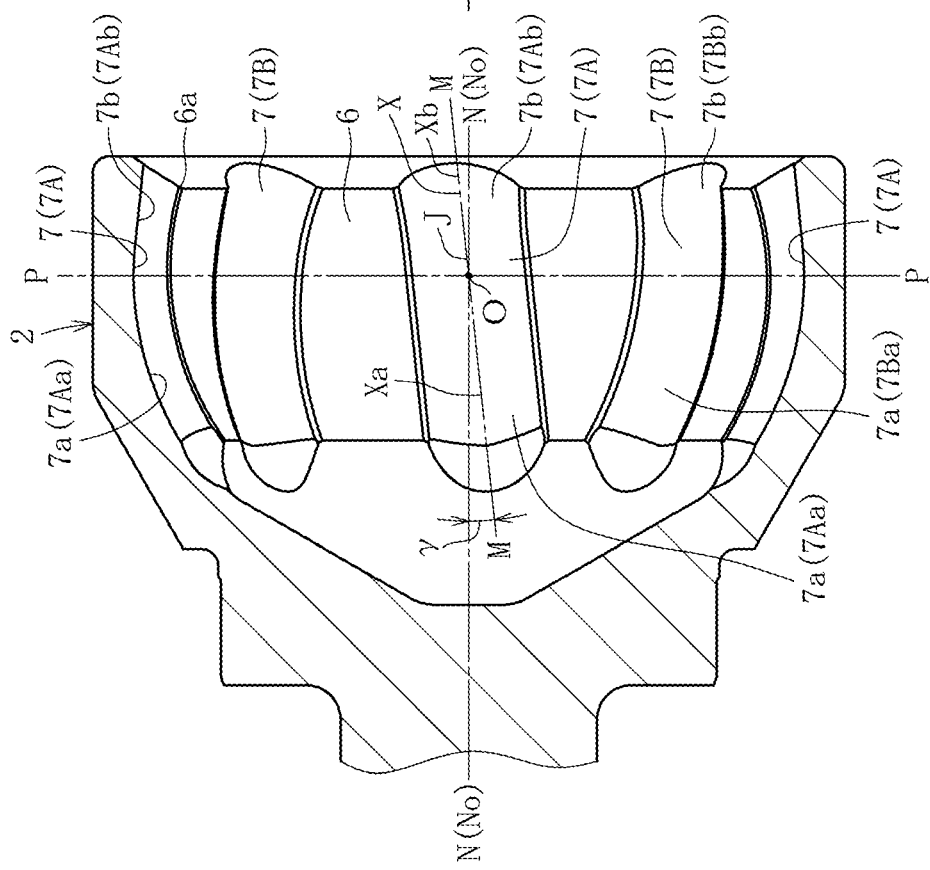
Figure 15A:
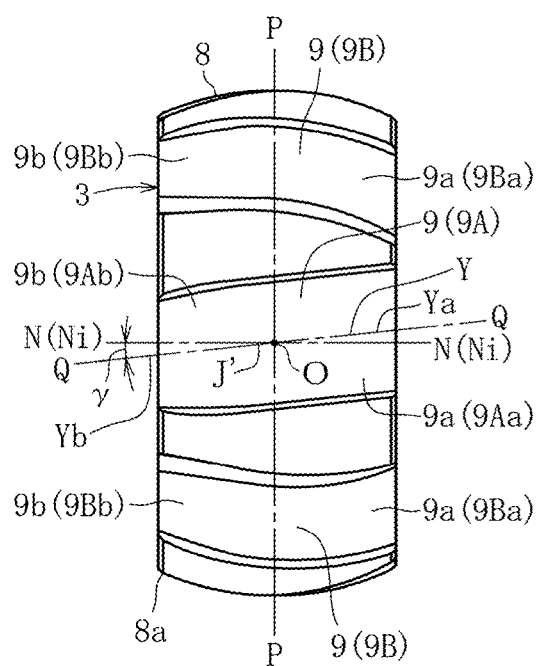
Figure 15B:
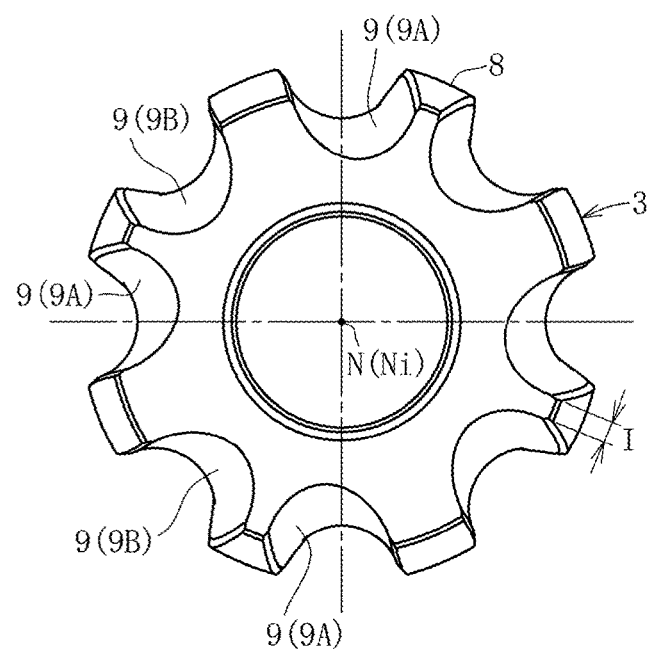

A fixed type constant velocity universal joint according to a second embodiment of the present invention is described with reference to FIGS. 13 to FIGS. 15. FIG. 13a is a longitudinal sectional view for illustrating the fixed type constant velocity universal joint according to this embodiment. FIG. 13b is a right-side view of FIG. 13a. FIG. 14a is a longitudinal sectional view for illustrating the outer joint member of FIG. 13a. FIG. 14b is a right-side view of FIG. 14a. FIG. 15a is a front view for illustrating the inner joint member of FIG. 13a. FIG. 15b is a right-side view of FIG. 15a.

As illustrated in FIG. 13a and FIG. 13b, the fixed type constant velocity universal joint 1 mainly comprises the outer joint member 2, the inner joint member 3, the balls 4, and the cage 5. The spherical inner peripheral surface 6 of the outer joint member 2 has the eight track grooves 7. The spherical outer peripheral surface 8 of the inner joint member 3 has the eight track grooves 9 opposed to the track grooves 7 of the outer joint member 2. The cage 5 configured to retain the balls 4 is arranged between the spherical inner peripheral surface 6 of the outer joint member 2 and the spherical outer peripheral surface 8 of the inner joint member 3. The spherical outer peripheral surface 12 of the cage 5 is fitted to the spherical inner peripheral surface 6 of the outer joint member 2 in a freely slidable manner, and the spherical inner peripheral surface 13 of the cage 5 is fitted to the spherical outer peripheral surface 8 of the inner joint member 3 in a freely slidable manner.

The curvature center of the spherical inner peripheral surface 6 of the outer joint member 2 and the curvature center of the spherical outer peripheral surface 8 of the inner joint member 3 are each formed at the joint center O. The curvature centers of the spherical outer peripheral surface 12 and the spherical inner peripheral surface 13 of the cage 5 which are fitted to the spherical inner peripheral surface 6 of the outer joint member 2 and the spherical outer peripheral surface 8 of the inner joint member 3, respectively, are also located at the joint center O.

As illustrated in FIG. 13b, FIG. 14a, FIG. 14b, FIG. 15a, and FIG. 15b, the eight track grooves 7 and 9 of the outer joint member 2 and the inner joint member 3 are inclined in the circumferential direction with respect to the axis N-N of the joint and are formed with such inclination directions that the track grooves 7A and 7B adjacent to each other in the circumferential direction are inclined in opposite directions and that the track grooves 9A and 9B adjacent to each other in the circumferential direction are inclined in opposite directions. The eight balls 4 are arranged at respective intersecting portions of paired track grooves 7A and 9A and paired track grooves 7B and 9B of the outer joint member 2 and the inner joint member 3. In FIG. 13a, illustration is given of the track grooves 7 and 9 in a state in which respective cross sections taken along the plane M illustrated in FIG. 14a and the plane Q illustrated in FIG. 15a are rotated to an inclination angle γ=0°. The axis N-N of the joint serves also as the axis No-No of the outer joint member and the axis Ni-Ni of the inner joint member.

As illustrated in FIG. 13a, the track groove 7 of the outer joint member 2 has the ball raceway center line X. The track groove 7 is formed of a first track groove portion 7a and a second track groove portion 7b. The first track groove portion 7a has an arc-shaped ball raceway center line Xa having a curvature center at the joint center O. The second track groove portion 7b has a linear ball raceway center line Xb. The ball raceway center line Xb of the second track groove portion 7b is smoothly connected as a tangent to the ball raceway center line Xa of the first track groove portion 7a.

As illustrated in FIG. 13a, the track groove 9 of the inner joint member 3 has the ball raceway center line Y. The track groove 9 is formed of a first track groove portion 9a and a second track groove portion 9b. The first track groove portion 9a has an arc-shaped ball raceway center line Ya having a curvature center at the joint center O. The second track groove portion 9b has a linear ball raceway center line Yb. The ball raceway center line Yb of the second track groove portion 9b is smoothly connected as a tangent to the ball raceway center line Ya of the first track groove portion 9a. Respective curvature centers of the ball raceway center lines Xa and Ya of the first track groove portions 7a and 9a are arranged at the joint center O, that is, on the axis N-N of the joint. As a result, the depths of the track grooves can be uniformly set, and processing can easily be carried out.

With reference to FIG. 14a and FIG. 14b, a detailed description is made of the state in which the track grooves 7 of the outer joint member 2 are inclined in the circumferential direction with respect to the axis N-N of the joint. The track grooves 7 of the outer joint member 2 are denoted by reference symbols 7A and 7B based on the difference in the inclination directions. As illustrated in FIG. 14a, the plane M including the ball raceway center line X of the track groove 7A and the joint center O is inclined by the angle y with respect to the axis N-N of the joint. Regarding each of the track grooves 7B adjacent to the track groove 7A in the circumferential direction, although illustration is omitted, the plane M including the ball raceway center line X of the track groove 7B and the joint center O is inclined by the angle y with respect to the axis N-N of the joint in the direction opposite to the inclination direction of the track groove 7A.

In this embodiment, the entirety of the ball raceway center line X of the track groove 7A, that is, both of the ball raceway center line Xa of the first track groove portion 7a and the ball raceway center line Xb of the second track groove portion 7b are formed on the plane M. However, the present invention is not limited to this mode and can be carried out with a mode in which only the ball raceway center line Xa of the first track groove portion 7a is included in the plane M. Thus, it is only required that the plane M including at least the ball raceway center line Xa of the first track groove portion 7a and the joint center O be inclined with respect to the axis N-N of the joint and that the first track groove portions 7a adjacent to each other in the circumferential direction be formed so as to have inclination directions set in the opposite directions.

Here, a supplementary description is made of reference symbols of the track grooves. The entire track groove of the outer joint member 2 is denoted by reference symbol 7. The first track groove portion of the track groove is denoted by reference symbol 7a, and the second track groove portion is denoted by reference symbol 7b. Further, track grooves having different inclination directions are denoted by reference symbols 7A and 7B for distinction. Respective first track groove portions are denoted by reference symbols 7Aa and 7Ba, and respective second track groove portions are denoted by reference symbols 7Ab and 7Bb. The track grooves of the inner joint member 3 to be described later are denoted by reference symbols in a similar manner.

Next, with reference to FIG. 15a and FIG. 15b, a detailed description is made of the state in which the track grooves 9 of the inner joint member 3 are inclined in the circumferential direction with respect to the axis N-N of the joint. The track grooves 9 of the inner joint member 3 are denoted by reference symbols 9A and 9B based on the difference in the inclination directions. As illustrated in FIG. 15a, the plane Q including the ball raceway center line Y of the track groove 9A and the joint center O is inclined by the angle y with respect to the axis N-N of the joint. Regarding each of the track grooves 9B adjacent to the track groove 9A in the circumferential direction, although illustration is omitted, the plane Q including the ball raceway center line Y of the track groove 9B and the joint center O is inclined by the angle y with respect to the axis N-N of the joint in the direction opposite to the inclination direction of the track groove 9A. It is preferred that the inclination angle y be set within the range of from 4° to 12° in consideration of the operability of the constant velocity universal joint 1 and a spherical surface width I on the side on which the track grooves of the inner joint member 3 are closest to each other.

Moreover, similarly to the outer joint member mentioned above, in this embodiment, the entirety of the ball raceway center line Y of the track groove 9A, that is, both of the ball raceway center line Ya of the first track groove portion 9a and the ball raceway center line Yb of the second track groove portion 9b are formed on the plane Q. However, the present invention is not limited to this mode and can be carried out with a mode in which only the ball raceway center line Ya of the first track groove portion 9a is included in the plane Q. Thus, it is only required that the plane Q including at least the ball raceway center line Ya of the first track groove portion 9a and the joint center O be inclined with respect to the axis N-N of the joint in the circumferential direction and that the first track groove portions 9a adjacent to each other in the circumferential direction be formed so as to have inclination directions set in the opposite directions. The ball raceway center line Y of the track groove 9 of the inner joint member 3 is formed so as to be mirror-symmetric with the ball raceway center line X of the paired track groove 7 of the outer joint member 2 with the plane P including the joint center O in the state of the operating angle of 0° as a reference.

With reference to FIG. 13a, a detailed description is made of the track grooves of the outer joint member 2 and the inner joint member 3 as seen on the longitudinal cross section. In FIG. 13a, illustration is given of the track grooves 7 and 9 in the state in which respective cross sections as seen on the plane M illustrated in FIG. 14a and the plane Q illustrated in FIG. 15a are rotated to the inclination angle γ=0°. That is, FIG. 13a is a sectional view taken along the plane M of FIG. 14a including the ball raceway center line X of the track groove 7A of the outer joint member 2 and the joint center O. Thus, in a strict sense, FIG. 13a is not a longitudinal sectional view taken along the plane including the axis N-N of the joint and is an illustration of the cross section inclined by the angle γ. In FIG. 13a, the track groove 7A of the outer joint member 2 is illustrated. The track groove 7B has the inclination direction opposite to that of the track groove 7A, and other configurations of the track groove 7B are the same as those of the track groove 7A. Therefore, description of the track groove 7B is omitted. The spherical inner peripheral surface 6 of the outer joint member 2 has the track grooves 7A extending substantially along the axial direction.

The track groove 7A has the ball raceway center line X. The track groove 7A is formed of the first track groove portion 7Aa and the second track groove portion 7Ab. The first track groove portion 7Aa has the arc-shaped ball raceway center line Xa having a curvature center at the joint center O (no offset in the axial direction). The second track groove portion 7Ab has the linear ball raceway center line Xb. At an end portion J of the ball raceway center line Xa of the first track groove portion 7Aa on the opening side, the linear ball raceway center line Xb of the second track groove portion 7Ab is smoothly connected as a tangent. That is, the end portion J serves as a connection point between the first track groove portion 7Aa and the second track groove portion 7Ab. The end portion J is located more on the opening side than the joint center O. Therefore, the linear ball raceway center line Xb of the second track groove portion 7Ab connected as a tangent at the end portion J of the ball raceway center line Xa of the first track groove portion 7Aa on the opening side is formed in such a manner as to approach the axis N-N of the joint as approaching the opening side. With this configuration, the wedge angle can be prevented from being excessively large.

As illustrated in FIG. 13a, a straight line connecting the end portion J and the joint center O to each other is denoted by reference symbol S. An axis N'-N' of the joint projected on the plane M including the ball raceway center line X of the track groove 7A and the joint center O is inclined by the angle y with respect to the axis N-N of the joint, and an angle formed between a perpendicular line K, which is perpendicular to the axis N'-N' at the joint center O, and the straight line S is denoted by reference symbol β'. The perpendicular line K described above is located on the plane P including the joint center O in the state of the operating angle of 0°. Thus, an angle β formed by the straight line S with respect to the plane P including the joint center O in the state of the operating angle of 0° in the present invention has a relationship of sin β=sin β'×cos γ.

Similarly, with reference to FIG. 13a, a detailed description is made of the track grooves of the inner joint member 3 as seen on the longitudinal cross section. FIG. 13a is a sectional view taken along the plane Q of FIG. 15a including the ball raceway center line Y of the track groove 9A of the inner joint member 3 and the joint center O. Thus, in a strict sense, FIG. 15a is not a longitudinal sectional view taken along the plane including the axis N-N of the joint and is an illustration of the cross section inclined by the angle γ. In FIG. 13a, the track groove 9A of the inner joint member 3 is illustrated. The track groove 9B has the inclination direction opposite to that of the track groove 9A, and other configurations of the track groove 9B are the same as those of the track groove 9A. Therefore, description of the track groove 9B is omitted. The spherical outer peripheral surface 8 of the inner joint member 3 has the track grooves 9A extending substantially along the axial direction.

The track groove 9A has the ball raceway center line Y. The track groove 9A is formed of a first track groove portion 9Aa and a second track groove portion 9Ab. The first track groove portion 9Aa has the arc-shaped ball raceway center line Ya having a curvature center at the joint center O (no offset in the axial direction). The second track groove portion 9Ab has the linear ball raceway center line Yb. At an end portion J' of the ball raceway center line Ya of the first track groove portion 9Aa on the back side, the ball raceway center line Yb of the second track groove portion 9Ab is smoothly connected as a tangent. That is, the end portion J' serves as a connection point between the first track groove portion 9Aa and the second track groove portion 9Ab. The end portion J' is located more on the back side than the joint center O. Therefore, the linear ball raceway center line Yb of the second track groove portion 9Ab connected as a tangent at the end portion J' of the ball raceway center line Ya of the first track groove portion 9Aa on the back side is formed in such a manner as to approach the axis N-N of the joint as approaching the back side. With this configuration, the wedge angle can be prevented from being excessively large.

As illustrated in FIG. 13a, a straight line connecting the end portion J' and the joint center O to each other is denoted by reference symbol S'. The axis N'-N' of the joint projected on the plane Q including the ball raceway center line Y of the track groove 9A and the joint center O is inclined by the angle y with respect to the axis N-N of the joint, and an angle formed between the perpendicular line K, which is perpendicular to the axis N'-N' at the joint center O, and the straight line S' is denoted by reference symbol β'. The perpendicular line K described above is located on the plane P including the joint center O in the state of the operating angle of 0°. Thus, an angle β formed by the straight line S' with respect to the plane P including the joint center O in the state of the operating angle of 0° has a relationship of sin β=sin β'×cos γ.

Next, description is made of the angle β formed by each of the straight lines S and S' with respect to the plane P including the joint center O in the state of the operation angle of 0°. When the operating angle θ is taken, the ball 4 moves by θ/2 with respect to the plane P including the joint center O of the outer joint member 2 and the inner joint member 3. The angle β is determined based on ½ of the operating angle that is frequently used, and the range of the track groove in which the ball 4 comes into contact is determined within the range of the operating angle that is frequently used. Here, a definition of the operating angle that is frequently used is given. First, a normal operating angle of a joint is an operating angle that is formed in a fixed type constant velocity universal joint for a front drive shaft when an automobile with one passenger is steered to go straight on a horizontal and flat road. In general, the normal operating angle is selected and determined within the range of from 2° to 15° depending on design conditions for various types of automobiles.

With the angle β described above, in FIG. 13a, the end portion J of the ball raceway center line Xa of the first track groove portion 7Aa corresponds to a center position of the ball that moves most toward the opening side along the axial direction at the time of the normal operating angle. Similarly, in the inner joint member 3, the end portion J' of the ball raceway center line Ya of the first track groove portion 9Aa corresponds to a center position of the ball that moves most toward the back side along the axial direction at the time of the normal operating angle. With such settings, within the range of the normal operating angle, the balls 4 are located at the first track groove portions 7Aa and 9Aa and the first track groove portions 7Ba and 9Ba, which have the opposite inclination direction, of the outer joint member 2 and the inner joint member 3. Therefore, forces acting in opposite directions are applied by the balls 4 to the pocket 5a of the cage 5 adjacent to each other in the circumferential direction, thereby stabilizing the cage 5 at the position of the joint center O (see FIG. 13a). Therefore, a contact force between the spherical outer peripheral surface 12 of the cage 5 and the spherical inner peripheral surface 6 of the outer joint member 2 and a contact force between the spherical inner peripheral surface 13 of the cage 5 and the spherical outer peripheral surface 8 of the inner joint member 3 are suppressed, and torque loss and generation of heat are suppressed, thereby improving the durability.

In the constant velocity universal joint according to this embodiment, clearance may be set for the fitting of the pocket 5a of the cage 5 and the ball 4. In this case, it is preferred that the clearance be set within the range of from about 0 μm to about 40 μm. When the clearance is set, the balls 4 retained in the pocket 5a of the cage 5 can be smoothly operated, thereby being capable of achieving further reduction of the torque loss.

In the range of the large operating angle, the balls 4 arranged in the circumferential direction are temporarily and separately located at the first track groove portions 7Aa and 9Aa and the second track groove portions 7Ab and 9Ab. As a result, the forces applied by the balls 4 to the pocket 5a of the cage 5 are not balanced, and the contact force is generated at spherical-surface contact portions 12 and 6 between the cage 5 and the outer joint member 2 and at spherical-surface contact portions 13 and 8 between the cage 5 and the inner joint member 3. However, the range of the large operating angle is not frequently used. Therefore, the constant velocity universal joint 1 according to this embodiment is capable of suppressing the torque loss and generation of heat as a whole. Accordingly, a fixed type constant velocity universal joint which is small in torque loss and generation of heat and is highly efficient can be achieved.

The overall configuration of the fixed type constant velocity universal joint 1 according to this embodiment is as described above. The fixed type constant velocity universal joint 1 according to this embodiment is set to have a maximum operating angle that significantly exceeds 50°. Similarly to the first embodiment, the characteristic configurations are as described below.

(1) The fixed type constant velocity universal joint 1 according to this embodiment has an operation mode in which, when a maximum operating angle is taken, the ball 4 that moves most toward the opening side of the track groove 7 of the outer joint member 2 comes off the end portion of the track groove 7 of the outer joint member 2 on the opening side to start the non-contact state with respect to the track groove 7 at the phase angle φ2 and returns to the end portion of the track groove 7 of the outer joint member 2 on the opening side to start the contact state with respect to the track groove 7 at the phase angle φ1.

(2) Under the state in which the maximum operating angle is taken, in the column portion 5b that is one of the column portions 5b and 5b' on both sides of the pocket 5a of the cage 5 receiving the ball 4 at the phase angle φ1 and is located on the side corresponding to the phase angle larger than the phase angle φ1, the projection end portion Eo obtained by projecting the end portion 6a of the spherical inner peripheral surface 6 of the outer joint member 2 on the opening side in the perpendicular direction toward the spherical outer peripheral surface 12 of the cage 5 and the projection end portion Ei obtained by projecting the end portion 8a of the spherical outer peripheral surface 8 of the inner joint member 3 on the back side in the perpendicular direction toward the spherical inner peripheral surface 13 of the cage 5 at least partially overlap each other in the axial direction of the cage 5.

The contents of the description regarding the fixed type constant velocity universal joint 1 according to the first embodiment with reference to FIG. 2 and the contents of the description regarding the characteristic configurations and actions and effects thereof with reference to FIGS. 3 to FIG. 12 similarly apply to the fixed type constant velocity universal joint 1 according to this embodiment. Therefore, the contents described in the first embodiment are applied, and only the point is described.

The length L1 from the joint center O to the opening side end portion of the outer joint member 2 of the fixed type constant velocity universal joint 1 according to this embodiment illustrated in FIG. 13a is significantly reduced, and the operation mode of the characteristic configuration (1) described above is given.

Moreover, as illustrated in FIG. 13a, when there are given Ro representing a radius of the spherical outer peripheral surface 12 of the cage 5, Ri representing a radius of the spherical inner peripheral surface 13, and Rm=(Ro+Ri)/2 representing a radius of the center of the cage 5 in the radial thickness direction, also in the fixed type constant velocity universal joint 1 according to this embodiment, under the state in which the maximum operating angle is taken, in the column portion that is one of the column portions on both sides of the pocket of the cage receiving the ball at the phase angle φ1 and is located on the side corresponding to the phase angle larger than the phase angle φ1, the ratio Lt/Rm between the length Lt of the overlapping portion T in the axial direction of the cage 5 at which the projection end portion Eo obtained by projecting the end portion of the spherical inner peripheral surface of the outer joint member on the opening side in the perpendicular direction toward the spherical outer peripheral surface of the cage and the projection end portion Ei obtained by projecting the end portion of the spherical outer peripheral surface of the inner joint member on the back side in the perpendicular direction toward the spherical inner peripheral surface of the cage overlap each other and the radius Rm of the center of the cage 5 in the radial thickness direction is set to be equal to or more than 0.03.

In the fixed type constant velocity universal joint 1 according to this embodiment, as mentioned above, the track grooves 7 and 9 are inclined in the circumferential direction. Therefore, when the fixed type constant velocity universal joint 1 is rotated in the counterclockwise direction illustrated in FIG. 5, the phase angle φ1 at which the ball 4 returns to the end portion of the track groove 7 of the outer joint member 2 on the opening side to start the contact state with respect to the track groove 7 is, for example, 24° at the track groove 7A and is, for example, 27° at the track groove 7B. Moreover, the phase angle φ2 at which the ball 4 comes off the end portion of the track groove 7 of the outer joint member 2 on the opening side to start the non-contact state with respect to the track groove 7 is, for example, 336° at the track groove 7A and is, for example, 333° at the track groove 7B. That is, when the fixed type constant velocity universal joint 1 is rotated in the counterclockwise direction illustrated in FIG. 5, under the state in which the maximum operating angle corresponding to the characteristic configuration (2) of the fixed type constant velocity universal joint 1 according to this embodiment is taken, in the column portion 5b that is one of the column portions 5b and 5b' on both sides of the pocket 5a of the cage 5 receiving the ball 4 at the phase angle φ1 and is located on the side corresponding to the phase angle larger than the phase angle φ1, the projection end portion Eo obtained by projecting the end portion 6a of the spherical inner peripheral surface 6 of the outer joint member 2 on the opening side in the perpendicular direction toward the spherical outer peripheral surface 12 of the cage 5 and the projection end portion Ei obtained by projecting the end portion 8a of the spherical outer peripheral surface 8 of the inner joint member 3 on the back side in the perpendicular direction toward the spherical inner peripheral surface 13 of the cage 5 at least partially overlap each other in the axial direction of the cage 5 at the spherical inner peripheral surface 6, which is one of the spherical inner peripheral surfaces 6 on both sides of the track groove 7B and is located on the side on which the phase angle proceeds, and the spherical outer peripheral surface 8 of the inner joint member 3 opposed to the spherical inner peripheral surface 6. This is because, when the fixed type constant velocity universal joint 1 is rotated in the counterclockwise direction, the track groove 7B has a contact locus shorter than that of the track groove 7A.

Figure 16B:
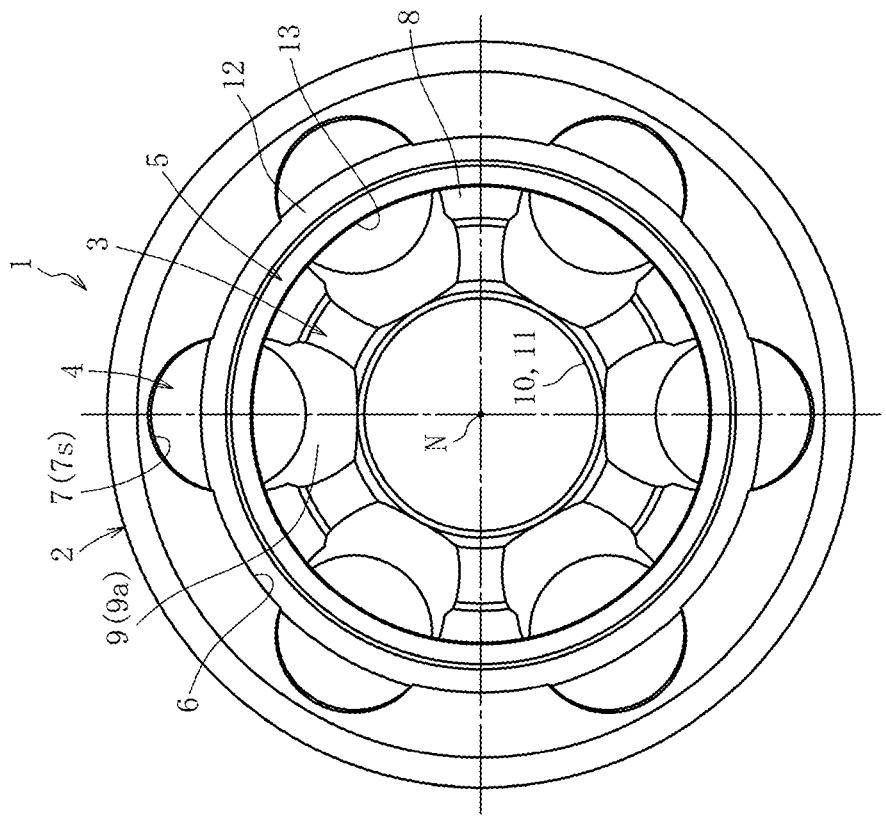
Figure 16A:
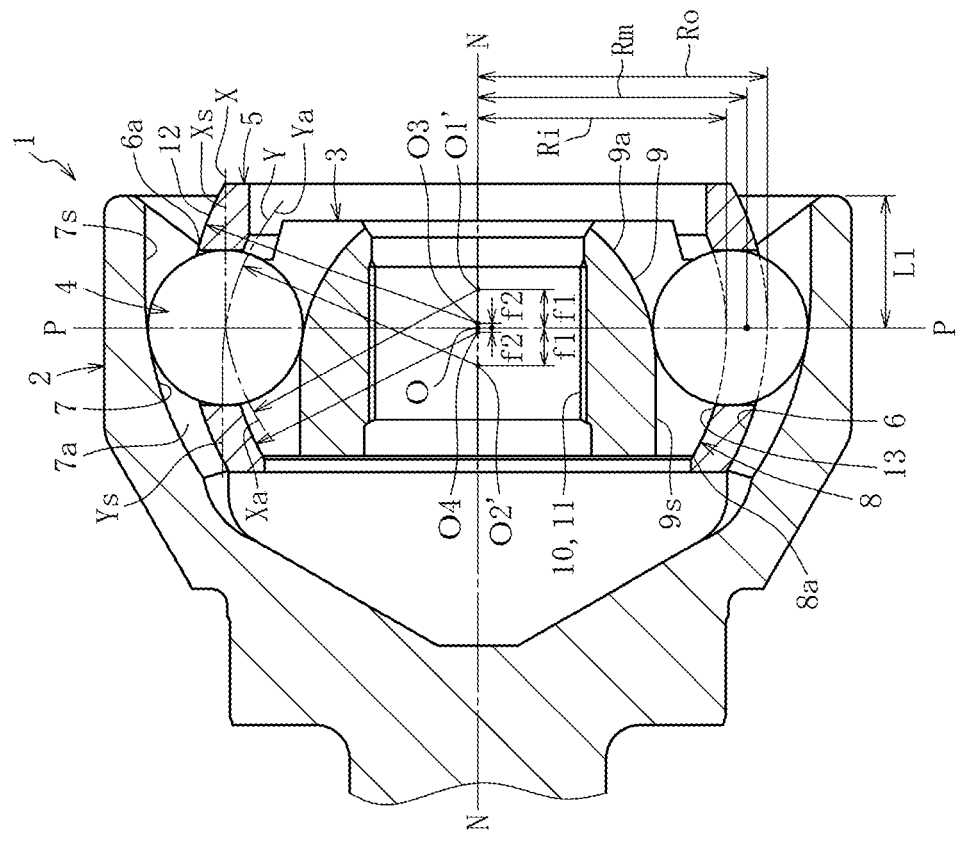
FIG. 16a is a longitudinal sectional view for illustrating a fixed type constant velocity universal joint according to a third embodiment of the present invention.

A fixed type constant velocity universal joint according to a third embodiment of the present invention is described with reference to FIG. 16a and FIG. 16b. FIG. 16a is a longitudinal sectional view for illustrating the fixed type constant velocity universal joint according to this embodiment. FIG. 16b is a right-side view of FIG. 16a. The fixed type constant velocity universal joint 1 according to this embodiment is based on an undercut-free constant velocity universal joint and mainly comprises the outer joint member 2, the inner joint member 3, the torque transmission balls (hereinafter simply referred to as "balls") 4, and the cage 5.

The spherical inner peripheral surface 6 of the outer joint member 2 has six track grooves 7. The track grooves 7 are formed at equal intervals in the circumferential direction and extend along the axial direction. The spherical outer peripheral surface 8 of the inner joint member 3 has track grooves 9 opposed to the track grooves 7 of the outer joint member 2. The track grooves 9 are formed at equal intervals in the circumferential direction and extend along the axial direction. Six balls 4 configured to transmit torque are incorporated in pairs of the track grooves 7 of the outer joint member 2 and the track grooves 9 of the inner joint member 3, respectively. The cage 5 configured to retain the balls 4 is arranged between the spherical inner peripheral surface 6 of the outer joint member 2 and the spherical outer peripheral surface 8 of the inner joint member 3. The balls 4 are received in the pockets 5a of the cage 5. The spherical outer peripheral surface 12 of the cage 5 is fitted to the spherical inner peripheral surface 6 of the outer joint member 2 in a freely slidable manner, and the spherical inner peripheral surface 13 of the cage 5 is fitted to the spherical outer peripheral surface 8 of the inner joint member 3 in a freely slidable manner.

A curvature center O3 of the spherical inner peripheral surface 6 of the outer joint member 2 and the spherical outer peripheral surface 12 of the cage 5 and a curvature center O4 of the spherical outer peripheral surface 8 of the inner joint member 3 and the spherical inner peripheral surface 13 of the cage 5 are equally offset by a small distance f2 to opposite sides in the axial direction from the joint center O.

The curved track groove 7 of the outer joint member 2 is formed of a curved track groove portion 7a and a linear track groove portion 7s. The curved track groove portion 7a is located on the back side of the outer joint member 2. The linear track groove portion 7s is located on the opening side. The track groove 9 of the inner joint member 3 is formed of a curved track groove portion 9a and a linear track groove portion 9s. The curved track groove portion 9a is located on the opening side. The linear track groove portion 9s is located on the back side. A curvature center O1' of the ball raceway center line Xa of the curved track groove portion 7a of the outer joint member 2 and a curvature center O2' of the ball raceway center line Ya of the curved track groove portion 9a of the inner joint member 3 are equally offset by a distance f1 to opposite sides in the axial direction from the joint center O.

The ball raceway center line Xa of the curved track groove portion 7a of the outer joint member 2 and the ball raceway center line Xs of the linear track groove 7s are tangentially connected to each other, and the ball raceway center line Xs of the linear track groove portion 7s is formed to be parallel to the axis N-N of the joint from an axial position of the curvature center O1' to the opening side. The ball raceway center line Ya of the curved track groove portion 9a of the inner joint member 3 and the ball raceway center line Ys of the linear track groove 9s are tangentially connected to each other, and the ball raceway center line Ys of the linear track groove portion 9s is formed to be parallel to the axis N-N of the joint from an axial position of the curvature center O2' to the back side.

The overall configuration of the fixed type constant velocity universal joint 1 according to this embodiment is as described above. The fixed type constant velocity universal joint 1 according to this embodiment is set to have a maximum operating angle that exceeds 50°. Similarly to the first embodiment, the characteristic configurations are as described below.

(1) The fixed type constant velocity universal joint 1 according to this embodiment has an operation mode in which, when a maximum operating angle is taken, the ball 4 that moves most toward the opening side of the track groove 7 of the outer joint member 2 comes off the end portion of the track groove 7 of the outer joint member 2 on the opening side to start the non-contact state with respect to the track groove 7 at the phase angle φ2 and returns to the end portion of the track groove 7 of the outer joint member 2 on the opening side to start the contact state with respect to the track groove 7 at the phase angle φ1.

(2) Under the state in which the maximum operating angle is taken, in the column portion 5b that is one of the column portions 5b, 5b' on both sides of the pocket 5a of the cage 5 receiving the ball 4 at the phase angle φ1 and is located on the side corresponding to the phase angle larger than the phase angle φ1, the projection end portion Eo obtained by projecting the end portion 6a of the spherical inner peripheral surface 6 of the outer joint member 2 on the opening side in the perpendicular direction toward the spherical outer peripheral surface 12 of the cage 5 and the projection end portion Ei obtained by projecting the end portion 8a of the spherical outer peripheral surface 8 of the inner joint member 3 on the back side in the perpendicular direction toward the spherical inner peripheral surface 13 of the cage 5 at least partially overlap each other in the axial direction of the cage 5.

The contents of the description regarding the fixed type constant velocity universal joint 1 according to the first embodiment with reference to FIG. 2 and the contents of the description regarding the characteristic configurations and actions and effects thereof with reference to FIGS. 3 to FIG. 12 similarly apply to the fixed type constant velocity universal joint 1 according to this embodiment. Therefore, the contents described in the first embodiment are applied, and only the point is described.

The length L1 from the joint center O to the opening side end portion of the outer joint member 2 of the fixed type constant velocity universal joint 1 according to this embodiment illustrated in FIG. 13a is significantly reduced, and the operation mode of the characteristic configuration (1) described above is given.

Moreover, as illustrated in FIG. 16a, when there are given Ro representing a radius of the spherical outer peripheral surface 12 of the cage 5, Ri representing a radius of the spherical inner peripheral surface 13, and Rm=(Ro+Ri)/2 representing a radius of the center of the cage 5 in the radial thickness direction, also in the fixed type constant velocity universal joint 1 according to this embodiment, under the state in which the maximum operating angle is taken, in the column portion that is one of the column portions on both sides of the pocket of the cage receiving the ball at the phase angle φ1 and is located on the side corresponding to the phase angle larger than the phase angle φ1, the ratio Lt/Rm between the length Lt of the overlapping portion T in the axial direction of the cage 5 at which the projection end portion Eo obtained by projecting the end portion of the spherical inner peripheral surface of the outer joint member on the opening side in the perpendicular direction toward the spherical outer peripheral surface of the cage and the projection end portion Ei obtained by projecting the end portion of the spherical outer peripheral surface of the inner joint member on the back side in the perpendicular direction toward the spherical inner peripheral surface of the cage overlap each other and the radius Rm of the center of the cage 5 in the radial thickness direction is set to be equal to or more than 0.03.

In the fixed type constant velocity universal joint 1 according to this embodiment, the phase angle φ1 at which the ball 4 returns to the end portion of the track groove 7 of the outer joint member 2 on the opening side to start the contact state with respect to the track groove 7 is 30°, and the phase angle φ2 at which the ball 4 comes off the end portion of the track groove 7 of the outer joint member on the opening side to start the non-contact state with respect to the track groove 7 is 330°.

The fixed type constant velocity universal joint 1 according to each of the embodiments described above has the following characteristic configurations (1) and (2). Therefore, even when the maximum operating angle equal to or larger than that of the related art is taken, the strength of the cage 5 can be secured, and an increase in weight can be suppressed.

(1) The fixed type constant velocity universal joint 1 according to this embodiment has an operation mode in which, when a maximum operating angle is taken, the ball 4 that moves most toward the opening side of the track groove 7 of the outer joint member 2 comes off the end portion of the track groove 7 of the outer joint member 2 on the opening side to start the non-contact state with respect to the track groove 7 at the phase angle φ2 and returns to the end portion of the track groove 7 of the outer joint member 2 on the opening side to start the contact state with respect to the track groove 7 at the phase angle φ1.

(2) Under the state in which the maximum operating angle is taken, in the column portion 5b that is one of the column portions 5b and 5b'on both sides of the pocket 5a of the cage 5 receiving the ball 4 at the phase angle φ1 and is located on the side corresponding to the phase angle larger than the phase angle φ1, the projection end portion Eo obtained by projecting the end portion 6a of the spherical inner peripheral surface 6 of the outer joint member 2 on the opening side in the perpendicular direction toward the spherical outer peripheral surface 12 of the cage 5 and the projection end portion Ei obtained by projecting the end portion 8a of the spherical outer peripheral surface 8 of the inner joint member 3 on the back side in the perpendicular direction toward the spherical inner peripheral surface 13 of the cage 5 at least partially overlap each other in the axial direction of the cage 5.

The present invention is not limited to the above-mentioned embodiments. As a matter of course, the present invention can be carried out in various modes without departing from the spirit of the present invention. The scope of the present invention is defined in Claims, and encompasses equivalents described in Claims and all changes within the scope of Claims.

DESCRIPTION OF REFERENCE SIGNS 1 fixed type constant velocity universal joint
2 outer joint member
3 inner joint member
4 torque transmission ball
5 cage
5a pocket
5b column portion
5b' column portion
6 spherical inner peripheral surface
6a end portion
7 track groove
8 spherical outer peripheral surface
8a end portion
9 track groove
12 spherical outer peripheral surface
13 spherical inner peripheral surface
20 inlet chamfer
CLo contact locus
CLi contact locus
Eo projection end portion
Ei projection end portion
Lt length
N axis of joint
O joint center
O1 curvature center
O1' curvature center
O2 curvature center
O2' curvature center
O3 curvature center
O4 curvature center
P plane
Ri radius
Ro radius
Rm radius
T overlapping portion
W distance
X ball raceway center line
Xa ball raceway center line
Xb ball raceway center line
Xs ball raceway center line
Y ball raceway center line
Ya ball raceway center line
Yb ball raceway center line
Ys ball raceway center line f distance
f1 distance
f2 distance
θ max maximum operating angle
φ0 phase angle
φ0 phase angle
φ2 phase angle

The invention claimed is:

1. A fixed type constant velocity universal joint comprising:
    an outer joint member, which has a plurality of track grooves being formed in a spherical inner peripheral surface of the outer joint member and extending substantially in a longitudinal direction, and has an opening side and a back side apart from each other in an axial direction of the outer joint member;
    an inner joint member, which has a plurality of track grooves being formed in a spherical outer peripheral surface of the inner joint member and extending substantially in the longitudinal direction so as to be opposed to the track grooves of the outer joint member;
    torque transmission balls incorporated in pairs of the track grooves opposed to each other; and
    a cage configured to retain the torque transmission balls, the cage comprising:
        a spherical outer peripheral surface to be guided by the spherical inner peripheral surface of the outer joint member; and
        a spherical inner peripheral surface to be guided by the spherical outer peripheral surface of the inner joint member,
    wherein the fixed type constant velocity universal joint has an operation mode in which, when a maximum operating angle is taken, a torque transmission ball of the torque transmission balls that is closest to an opening side of a track groove of the track grooves of the outer joint member comes off an end portion of the track groove of the outer joint member on the opening side to start a non-contact state with respect to the track groove at a first phase angle (φ2) position along a direction of rotation and returns to the end portion of the track groove of the outer joint member on the opening side to start a contact state with respect to the track groove at a second phase angle (φ1) position along the direction of rotation,
    wherein, under the state in which the maximum operating angle is taken, at a column portion that is one of column portions on opposite sides of a pocket of the cage receiving the torque transmission ball at the second phase angle (φ1) position and is located at a phase angle position ahead of the second phase angle (φ1) position along the direction of rotation, a first projection end portion (Eo) obtained by projecting an end portion of the spherical inner peripheral surface of the outer joint member on the opening side in a direction that is perpendicular to an axial direction of the cage toward the spherical outer peripheral surface of the cage and a second projection end portion (Ei) obtained by projecting an end portion of the spherical outer peripheral surface of the inner joint member that is closest to the back side of the outer joint member in the perpendicular direction toward the spherical inner peripheral surface of the cage at least partially overlap each other as an overlapping portion in the axial direction of the cage, and
    wherein, when a length of the cage at the overlapping portion in the axial direction of the cage is represented by Lt, and a radius of a center of the cage in a radial thickness direction of the cage is represented by Rm, a ratio Lt/Rm is set to be equal to or more than 0.03.

2. The fixed type constant velocity universal joint according to claim 1, wherein the track grooves of the outer joint member and the track grooves of the inner joint member are inclined in a circumferential direction with respect to an axis N-N of the fixed type constant velocity universal joint, and each of the torque transmission balls is incorporated in an intersecting portion of the track grooves.

* * * * *